US007650225B2

(12) United States Patent
Nakagawa et al.

(10) Patent No.: US 7,650,225 B2
(45) Date of Patent: Jan. 19, 2010

(54) ENGINE CONTROLLER

(75) Inventors: Shinji Nakagawa, Hitachinaka (JP); Kazuhiko Kanetoshi, Yokohama (JP); Kozo Katogi, Hitachi (JP); Takanobu Ichihara, Naka (JP); Minoru Ohsuga, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 4 days.

(21) Appl. No.: 11/797,889

(22) Filed: May 8, 2007

(65) Prior Publication Data

US 2007/0261671 A1 Nov. 15, 2007

(30) Foreign Application Priority Data

May 11, 2006 (JP) ............................ 2006-132056

(51) Int. Cl.
*G06F 19/00* (2006.01)
*F02D 41/00* (2006.01)

(52) U.S. Cl. .................... 701/109; 701/114; 73/114.17

(58) Field of Classification Search ................. 701/109, 701/111, 114; 73/114.01-114.11, 114.16, 73/114.17, 114.71-114.73
See application file for complete search history.

(56) References Cited

U.S. PATENT DOCUMENTS

| | | | | |
|---|---|---|---|---|
| 5,694,901 | A * | 12/1997 | Togai et al. | 123/436 |
| 5,828,976 | A * | 10/1998 | Fukuchi et al. | 701/110 |
| 5,991,685 | A * | 11/1999 | Fukuchi et al. | 701/110 |
| 6,330,795 | B1 * | 12/2001 | Takaku et al. | 60/277 |
| 6,430,495 | B2 * | 8/2002 | Takaku et al. | 701/114 |
| 6,474,302 | B2 * | 11/2002 | Takahashi et al. | 123/406.21 |
| 6,543,418 | B2 * | 4/2003 | Lavy | 123/435 |
| 6,792,901 | B2 * | 9/2004 | Sugiyama et al. | 123/90.15 |
| 6,994,077 | B2 * | 2/2006 | Kobayashi et al. | 123/568.11 |
| 7,131,266 | B2 * | 11/2006 | Kita et al. | 60/289 |
| 7,133,766 | B2 * | 11/2006 | Kokubo | 701/114 |
| 2002/0026930 | A1 * | 3/2002 | Ueno et al. | 123/679 |
| 2005/0211233 | A1 | 9/2005 | Moulin et al. | |
| 2006/0196486 | A1 * | 9/2006 | Wang et al. | 123/681 |

FOREIGN PATENT DOCUMENTS

| | | | |
|---|---|---|---|
| DE | 103 19 529 | B3 | 7/2004 |
| DE | 10 2004 038389 | A1 | 3/2006 |
| EP | 1 571 318 | A | 9/2005 |
| JP | 5-163992 | A | 6/1993 |
| JP | 6-229969 | A | 8/1994 |
| JP | 7-119533 | A | 5/1995 |
| JP | 10-30537 | A | 2/1998 |
| JP | 2003-83133 | A | 3/2003 |

OTHER PUBLICATIONS

Japanese Office Action dated Jun. 24, 2008 w/English translation (five (5) pages).
European Search Report mailed Nov. 28, 2008.

* cited by examiner

*Primary Examiner*—Stephen K Cronin
*Assistant Examiner*—Johnny H Hoang
(74) *Attorney, Agent, or Firm*—Crowell & Moring LLP

(57) ABSTRACT

An engine controller comprises a combustion state detection or estimation means for detecting or estimating a combustion state in the combustion chamber, a combustion air-fuel ratio estimation means for estimating a combustion air-fuel ratio in the combustion chamber according to an exhaust air-fuel ratio and the detected or estimated combustion state, and a means for calculating engine control parameters according to the estimated combustion air-fuel ratio.

24 Claims, 35 Drawing Sheets

<BASIC FUEL INJECTION CALCULATION MEANS 120>

<FUEL INJECTION CORRECTION CALCULATION MEANS 130>

<BASIC COMBUSTION AIR-FUEL RATIO VALUE CALCULATION MEANS 145>

<COMBUSTION STATE DETECTION MEANS 340>

<BASIC COMBUSTION AIR-FUEL RATIO VALUE CALCULATION MEANS 345>

<SECOND FUEL INJECTION CORRECTION CALCULATION MEANS 430>

<SECOND FUEL INJECTION CORRECTION CALCULATION MEANS 430'>

<EXHAUST AIR-FUEL RATIO FEEDBACK CONTROL MEANS 570>

<BASIC COMBUSTION AIR-FUEL RATIO VALUE CALCULATION MEANS 645>

ENGINE CONTROLLER

CLAIM OF PRIORITY

The present application claims priority from Japanese application serial no. 2006-132056, filed on May 11, 2006, the content of which is hereby incorporated by reference into this application.

FIELD OF THE INVENTION

The present invention relates to an engine controller that controls the amount of fuel to be injected (air-fuel ratio) and other factors and, more particularly, to a controller for a robust engine that can efficiently prevents air-flow ratio precision from being worsened at the time of start.

BACKGROUND OF THE INVENTION

In response to the recent enhanced exhaust emission control for automobiles in North America, Europe, Japan, and other countries, the improvement of engine exhaust emission characteristics is being strongly demanded. As the performance and control precision of catalysts are being improved, exhaust emission from engines is dominant when they are started. Highly precious air-fuel ratio control is also effective in improving the engine exhaust emission characteristics at the time of start. However, exhaust air-fuel ratio feedback control, in which an exhaust air-fuel ratio is detected and the amount of fuel to be injected is then corrected, is usually started at a fixed time (10 to 20 seconds) after the start.

An air-fuel ratio sensor is activated at an early stage and a preheat system is introduced, so there is the prospect that exhaust air-fuel ratio feedback control initiated at the start will be put into practical use. When the fuel vaporization rate is low because, for example, temperature is low or heavy fuel is used, fuel that entered the combustion chamber is exhausted into the exhaust path without being burned. The exhausted fuel is oxidized in the exhaust path and by an exhaust air-fuel ratio sensor probe. When this happens, the exhaust air-fuel ratio is higher than the actual combustion air-fuel ratio. If the exhaust air-fuel ratio is fed back and the amount of fuel is determined according to the feedback, the combustion air-fuel ratio is not properly controlled (the combustion does not approach stoichiometric combustion) and an excessively lean burn thereby occurs, lowering exhaust purifying performance and running operation. To avoid this situation, a technology for initiating the detection of the combustion air-fuel ratio with high precision at the time of start and controlling the combustion air-fuel ratio is necessary.

Accordingly, various control methods and apparatuses have been proposed as in Japanese Patent Laid-open No. 2003-83133 (Patent Document 1) and Japanese Patent Laid-open No. 10-30537 (Patent Document 2).

SUMMARY OF THE INVENTION

Patent Document 1 discloses a control method in which when the temperature at the start is low, a lower fuel correction limit is restricted according to exhaust air-fuel ratio feedback from an exhaust air-fuel ratio sensor so as to prevent an excessively lean burn from occurring. In this type of control method, however, the air-fuel ratio is just prevented from being excessively leaned; the combustion air-fuel ratio cannot be controlled to an appropriate air-fuel ratio. The lower limit is determined according to a particular fuel state. Accordingly, when the lower limit is determined for a soft fuel, for example, the possibility of a lean firemiss is increased; when the lower limit is determined for a heavy fuel, the control range for leaning a soft fuel is more restrictive than necessary.

Patent Document 2 discloses another control method in which a response characteristic until the amount of fuel to be corrected on the basis of air-fuel ratio feedback is reflected in combustion is detected for each cylinder according to a rotational variation so as to appropriately correct the ignition timing. In this type of control method, however, the ignition timing is just controlled by estimating a responsiveness from fuel ignition up to the control of the combustion exhaust air-fuel ratio, so the control method does not correct a difference between the exhaust air-fuel ratio and the combustion air-fuel ratio, nor does it control the combustion air-fuel ratio. Accordingly, the control method does not addresses the problems described above.

It is the most preferable to directly detect the combustion air-fuel ratio in the combustion chamber. However, there is large unevenness in the distribution of the air-fuel ratio in the cylinder, so a measurement at a single point does not yield high precision. An air-fuel ratio sensor needs to be attached for each cylinder, resulting in a high cost.

The present invention addresses the above problems with the object of providing an inexpensive engine controller that can control the combustion air-fuel ratio at the time of start with high precision.

To achieve the above object, an engine controller in a first aspect of the present invention comprises a combustion state detection or estimation means for detecting or estimating a combustion state in the combustion chamber and a combustion air-fuel ratio estimation means for estimating a combustion air-fuel ratio in the combustion chamber according to an exhaust air-fuel ratio and the detected or estimated combustion state (see FIG. 1).

As described above, for example, even when the exhaust air-fuel ratio becomes richer than the combustion air-fuel ratio due to the effect of the unburned fuel in the exhaust, the combustion state corresponds to the combustion air-fuel ratio. Accordingly, a means for detecting or estimating a combustion state is provided so as to monitor the validity of the exhaust air-fuel ratio and detect or estimate a more accurate combustion state with reference to the exhaust air-fuel ratio. It is preferable to directly detect the combustion air-fuel ratio to detect or estimate the combustion state. As described above, however, the unevenness of the intra-cylinder air-fuel ratio distribution is large, the precision in single-point measurement is poor, and an air-fuel ratio sensor required for each cylinder increases the cost, so air-fuel ratio sensors are not necessarily used and average information about combustion, such as, for example, an indicated mean effective pressure, rotational variations, and a combustion temperature is more preferable than the air-fuel ratio sensors.

An engine controller in a second aspect of the present invention has a means for calculating an engine control parameter according to the estimated combustion air-fuel ratio (see FIG. 2).

That is, since the engine is controlled according to the combustion air-fuel ratio, engine control performance is prevented from being worsened when an incorrect exhaust air-fuel ratio is detected as well as the engine control performance is improved.

In an engine controller in a third aspect of the present invention, the combustion state detection or estimation means estimates the combustion state according to engine revolutions or an nth-order differential value (n: integer) of the engine revolutions (see FIG. 3).

That is, the combustion state is detected or estimated according to variations in engine revolutions. In particular, when the first-order differential value, second-order differential value, and so on are used, the combustion state (variations in combustion) can be detected more precisely.

In an engine controller in a fourth aspect of the present invention, the combustion state detection or estimation means estimates the combustion state according to at least one of an intra-cylinder pressure, an intra-cylinder temperature, and a generated torque in the engine (see FIG. 3).

That is, the combustion state is stipulated as the intra-cylinder pressure (combustion pressure), intra-cylinder temperature, and generated torque in the engine. Although none of these factors are detected in a dimension of the air-fuel ratio, they are physical quantities correlated to the combustion air-fuel ratio. The combustion air-fuel ratio is highly precisely detected or estimated from the detected values and the exhaust air-fuel ratio.

In an engine controller in a fifth aspect of the present invention, an exhaust sensor for sensing the exhaust air-fuel ratio is provided in an exhaust path (see FIG. 3).

That is, the exhaust air-fuel ratio is stipulated as being detected by the exhaust sensor provided in the exhaust path. The exhaust sensor may be, for example, an $O_2$ sensor, an NOx sensor, or the like.

In an engine controller in a sixth aspect of the present invention, the combustion state detection or estimation means calculates a basic combustion air-fuel ratio value from the combustion state and the combustion air-fuel ratio estimation means estimates the combustion air-fuel ratio according to the basic combustion air-fuel ratio value and the exhaust air-fuel ratio (see FIG. 4).

That is, the combustion state is converted to a parameter correlated to the combustion air-fuel ratio and the combustion air-fuel ratio is obtained from the basic combustion air-fuel ratio value and exhaust air-fuel ratio.

In an engine controller in a seventh aspect of the present invention, the combustion air-fuel ratio estimation means compares the basic combustion air-fuel ratio value with the exhaust air-fuel ratio and estimates either the basic combustion air-fuel ratio value or the exhaust air-fuel ratio as the combustion air-fuel ratio according to a comparison result (see FIG. 5).

In an engine controller in an eighth aspect of the present invention, the combustion air-fuel ratio estimation means estimates the larger of the basic combustion air-fuel ratio value and the exhaust air-fuel ratio as the combustion air-fuel ratio (see FIG. 5).

That is, when, for example, the exhaust air-fuel ratio becomes richer than the combustion air-fuel ratio due to the effect of the unburned fuel in the exhaust, the basic combustion air-fuel ratio value becomes leaner, that is, larger, than the exhaust air-fuel ratio. The basic combustion air-fuel ratio value is then used as the combustion air-fuel ratio.

In an engine controller in a ninth aspect of the present invention, the combustion air-fuel ratio estimation means calculates the amount of exhaust air-fuel ratio correction according to the combustion state and estimates a value obtained by correcting the exhaust air-fuel ratio with the calculated amount of exhaust air-fuel ratio correction as a combustion air-fuel ratio (see FIG. 6).

That is, error in the exhaust air-fuel ratio is corrected according to the estimated combustion state, and the corrected exhaust air-fuel ratio is used as the combustion air-fuel ratio.

In an engine controller in a tenth aspect of the present invention, the control parameter calculation means calculates at least one of the amount of fuel to be injected, an ignition timing, and the amount of air to be inhaled as the control parameter (see FIG. 7).

That is, targets to be controlled are stipulated as the amount of fuel to be injected, the ignition timing, and the amount of air to be inhaled.

An engine controller in an eleventh aspect of the present invention has a control parameter calculation permission means that permits or denies control parameter calculation, which is performed by the control parameter calculation means on the basis of the combustion air-fuel ratio, according to the running state of the engine (see FIG. 8).

That is, as described above, error in detection of the exhaust air-fuel ratio is likely to occur, particularly at a low temperature; accordingly, engine control parameter calculation based on the combustion air-fuel ratio is performed according to the engine running state, for example, only at a low temperature.

In an engine controller in a twelfth aspect of the present invention, the control parameter calculation permission means permits or denies the control parameter calculation according to an engine cooling water temperature, an inhaled air temperature, a time elapsed from the time of start, the total number of cycles after the start, the total amount of air inhaled after the start, and other parameters that typify an engine temperature.

That is, as described above, error in detection of the exhaust air-fuel ratio is likely to occur, particularly at a low temperature; accordingly, whether to perform the engine control parameter calculation based on the combustion air-fuel ratio is determined according to the values of the above parameters that typify an engine temperature for detecting a low-temperature condition.

In an engine controller in a thirteenth aspect of the present invention, the control parameter calculation permission means permits the engine control parameter calculation on the basis of the combustion air-fuel ratio when at least one of the following conditions is met: the engine cooling water temperature is equal to or lower than a prescribed value, the temperature of air to be inhaled into the engine is equal to or lower than a prescribed value, the time elapsed after the start of the engine is equal to or less than a prescribed value, the total number of cycles after the start of the engine is equal to or smaller than a prescribed value, and the total amount of air inhaled after the start of the engine is equal to or smaller than a prescribed value.

That is, as described in the eleventh and twelfth aspects, a low-temperature condition under which error in exhaust air-fuel ratio detection is likely to occur is detected by the above parameters that typify an engine temperature; engine control parameter calculation based on the combustion air-fuel ratio is performed only when appropriate conditions are met.

In an engine controller in a fourteenth aspect of the present invention, the control parameter calculation permission means has the control parameter calculation means correct engine control parameters on the basis of the exhaust air-fuel ratio or deny the engine control parameter calculation, when a difference or a ratio between the combustion air-fuel ratio and the exhaust air-fuel ratio is equal to or greater than a prescribed value (see FIG. 9).

That is, when the difference between the exhaust air-fuel ratio and the combustion air-fuel ratio is large, the credibility of the detected exhaust air-fuel ratio value is determined to be extremely low, stopping control in which the exhaust air-fuel ratio is used.

In an engine controller in a fifteenth aspect of the present invention, a control parameter for controlling the amount of fuel is corrected according to a fed-back exhaust air-fuel ratio, or feedback control is stopped.

That is, the controller described in the fourteenth aspect is called exhaust air-fuel ratio feedback control by which the exhaust air-fuel ratio is fed back so as to control the amount of fuel.

An engine controller in a sixteenth aspect of the present invention has a means for learning the relation between the combustion state and the basic combustion air-fuel ratio value according to the exhaust air-fuel ratio (see FIG. 10).

That is, the exhaust air-fuel ratio is used to learn the relation between the combustion state and the basic combustion air-fuel ratio value. More specifically, under a running condition in which there is no error between the combustion air-fuel ratio and the exhaust air-fuel ratio or the error is sufficiently small, the exhaust air-fuel ratio is regarded as the combustion air-fuel ratio and the relation between the combustion state and the exhaust air-fuel ratio at that time is learned as the relation between the combustion state and the combustion air-fuel ratio.

In an engine controller in a seventeenth aspect of the present invention, the learning means performs the learning according to the running state of the engine (see FIG. 11).

That is, as described in the sixteenth aspect, whether to perform the learning is determined according to the running condition of the engine.

In an engine controller in an eighteenth aspect of the present invention, the learning means performs the learning when at least one of the following conditions is met: the engine cooling water temperature is equal to or higher than a prescribed value, the temperature of air to be inhaled into the engine is equal to or higher than a prescribed value, a time elapsed after the start of the engine is equal to or more than a prescribed value, the total number of cycles after the start of the engine is equal to or more than a prescribed value, and the total amount of air inhaled after the start of the engine is equal to or more than a prescribed value.

That is, as described in the sixteenth and seventeenth aspects, the condition in which the engine temperature is sufficiently high, which is a running condition when there is no error between the combustion air-fuel ratio and the exhaust air-fuel ratio or the error is sufficiently small, is more specifically stipulated.

An engine controller in a nineteenth aspect of the present invention has a means for calculating a supply air-fuel ratio according to the amount of air to be inhaled into the engine and the amount of fuel to be injected (see FIG. 12).

That is, although the air-fuel ratio indicates a weight ratio between the amount of air and the amount of fuel, there are transmission properties in the amount of air and the amount of fuel in a process until the intake path, combustion chamber, and exhaust path are reached. In particular, in the air-fuel ratio transmission system, the effect by the transmission characteristic from fuel injection to combustion is large. In addition to the combustion air-fuel ratio, which is the air-fuel ratio in the combustion chamber, and the exhaust air-fuel ratio, which is the air-fuel ratio in the exhaust path, a means for calculating the supply air-fuel ratio, which is the air-fuel ratio in the intake path, is provided.

In an engine controller in a twentieth aspect of the present invention, the supply air-fuel ratio, the combustion air-fuel ratio, and the exhaust air-fuel ratio are estimated or detected independently (see FIG. 13).

That is, in addition to the estimation or detection of the exhaust air-fuel ratio and combustion air-fuel ratio described so far, a means for calculating the supply air-fuel ratio is provided separately, making online check of the air-fuel ratio transmission system more accurate.

In an engine controller in a twenty-first aspect of the present invention, the control parameter calculation means performs engine control parameter calculation according to the supply air-fuel ratio, the combustion air-fuel ratio, and the exhaust air-fuel ratio (see FIG. 14).

That is, the supply air-fuel ratio, combustion air-fuel ratio, and exhaust air-fuel ratio, which are typical parameters for the air-fuel ratio transmission system, are used as information from which to calculate the engine control parameters, enabling the air-fuel ratio during cold engine operation, transition, and the like to be controlled with high precision.

An engine controller in a twenty-second aspect of the present invention has a means for estimating a fuel state according to at least one of the supply air-fuel ratio, the combustion air-fuel ratio, and the exhaust air-fuel ratio (see FIG. 15).

That is, the characteristic of the air-fuel ratio transmission system is largely affected by the fuel vaporization rate; when, for example, the engine is cold, the fuel vaporization rate is relatively low and a difference in the fuel state is likely to cause an effect. In such an area, the supply air-fuel ratio, combustion air-fuel ratio, and exhaust air-fuel ratio are compared to detect the fuel state.

In an engine controller in a twenty-third aspect of the present invention, the combustion air-fuel ratio estimation means, the control parameter calculation means, and the fuel state estimation means handle the air-fuel ratio in a dimension of an equivalence ratio.

That is, when the equivalence ratio, which is proportional to the amount of fuel to be injected, is used to for calculation, the use of the air-fuel ratio is simplified and calculation error is lessened.

In an engine controller in a twenty-fourth aspect of the present invention, even when a detected value of the exhaust air-fuel ratio differs from the combustion exhaust air-fuel ratio during the execution of feedback control according to the exhaust air-fuel ratio, the combustion air-fuel ratio is controlled to a desired air-fuel ratio.

That is, it is stipulated that when the combustion air-fuel ratio is indirectly controlled by detecting the exhaust air-fuel ratio, if the exhaust air-fuel ratio differs from the combustion air-fuel ratio due to the effect of unburned fuel or the like, the use of the controller in the above aspect enables the combustion air-fuel ratio, which is the original purpose, to be controlled to a desired air-fuel ratio.

According to the present invention, the air-fuel ratio at the start of an engine can be controlled with high precision in an inexpensive manner. As a result, the exhaust emission characteristic at a cold engine start can be improved and high stability can be obtained.

DESCRIPTION OF THE PREFERRED EMBODIMENTS

An embodiment of an engine controller according to the present invention will be described with reference to the drawings.

Figure 1:
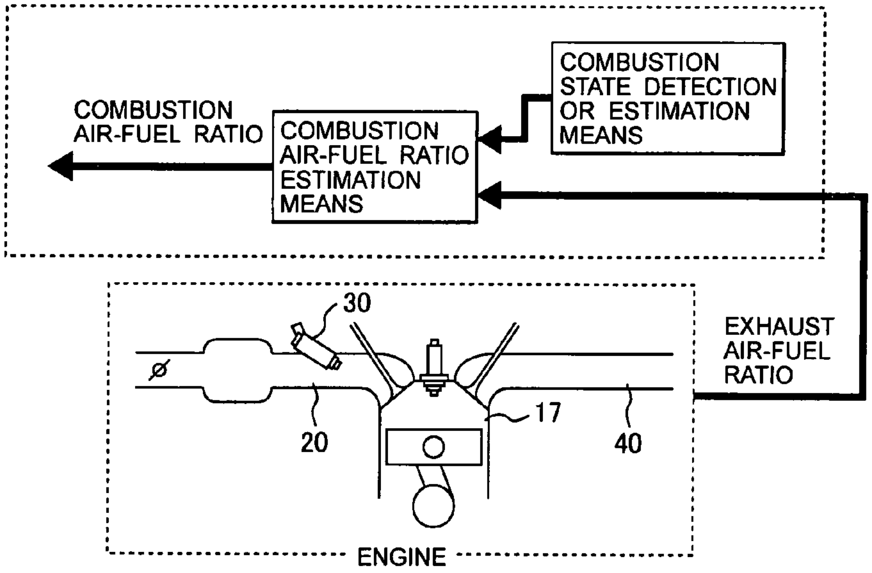
FIG. 1 is used to explain a controller in a first aspect of the present invention.
Figure 2:
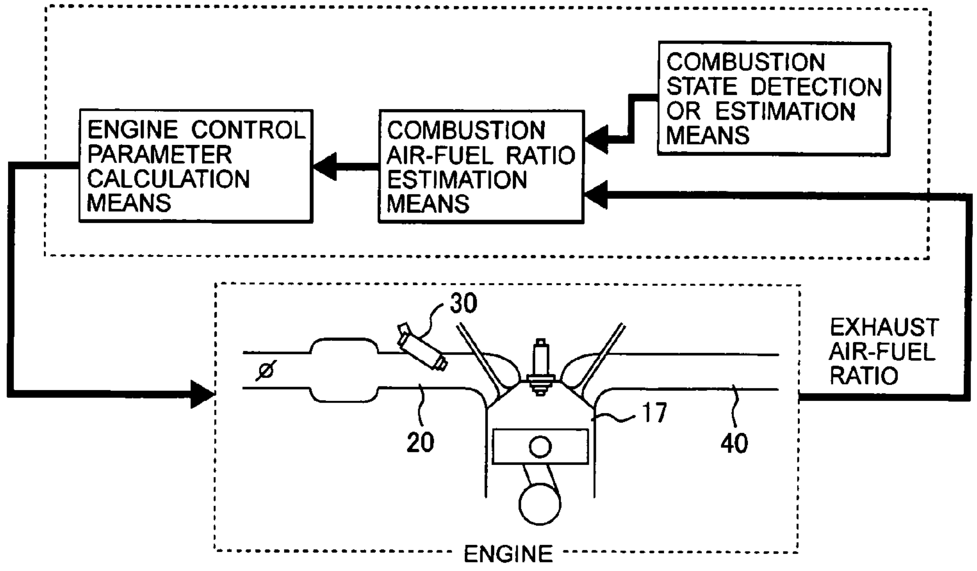
FIG. 2 is used to explain a controller in a second aspect of the present invention.
Figure 3:
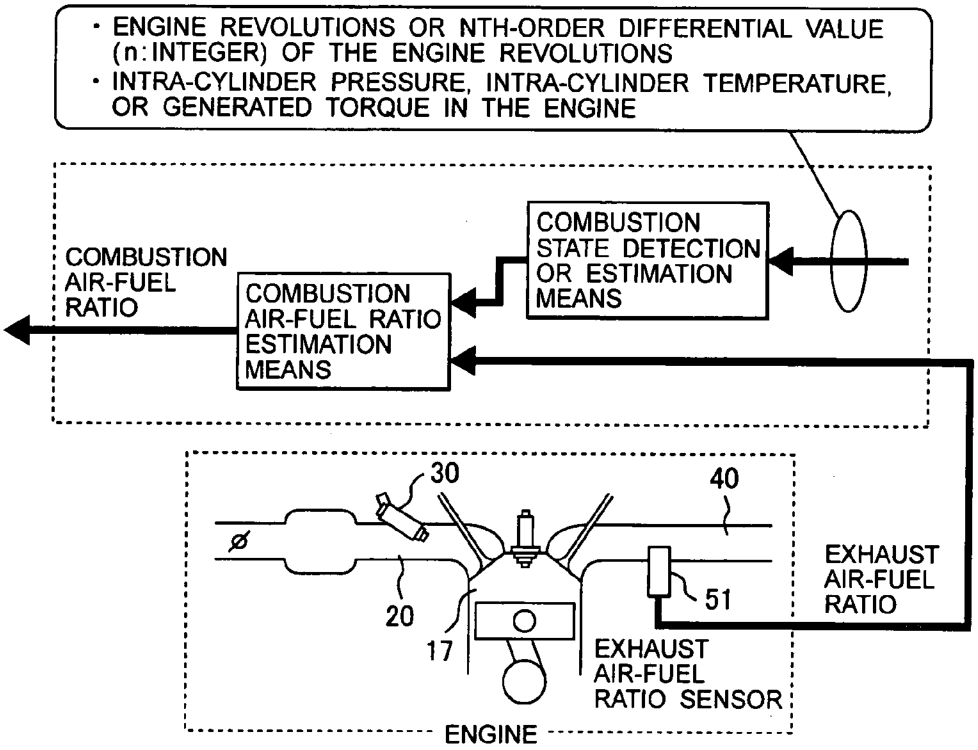
FIG. 3 is used to explain a controller in third to fifth aspects of the present invention.
Figure 4:
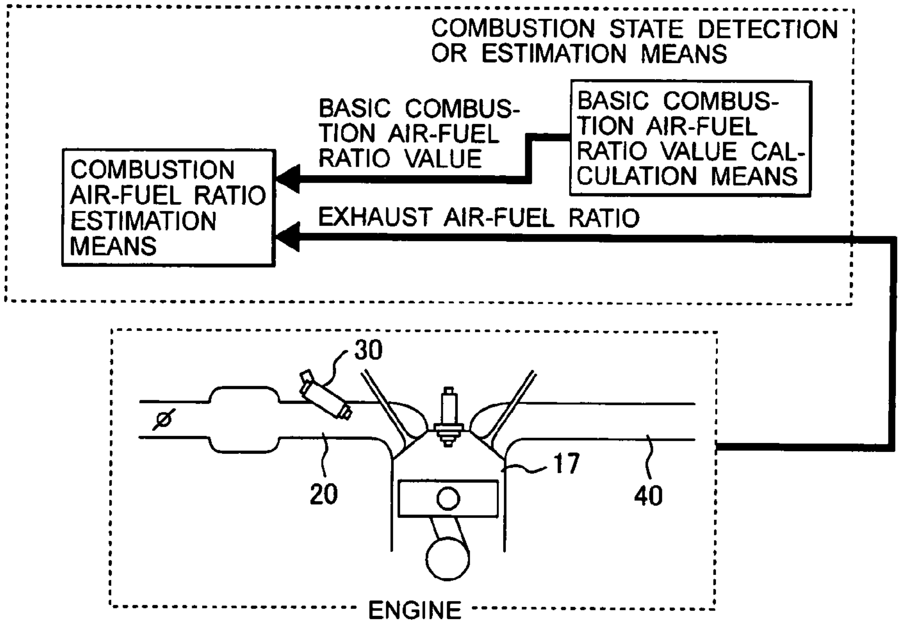
FIG. 4 is used to explain a controller in a sixth aspect of the present invention.
Figure 5:
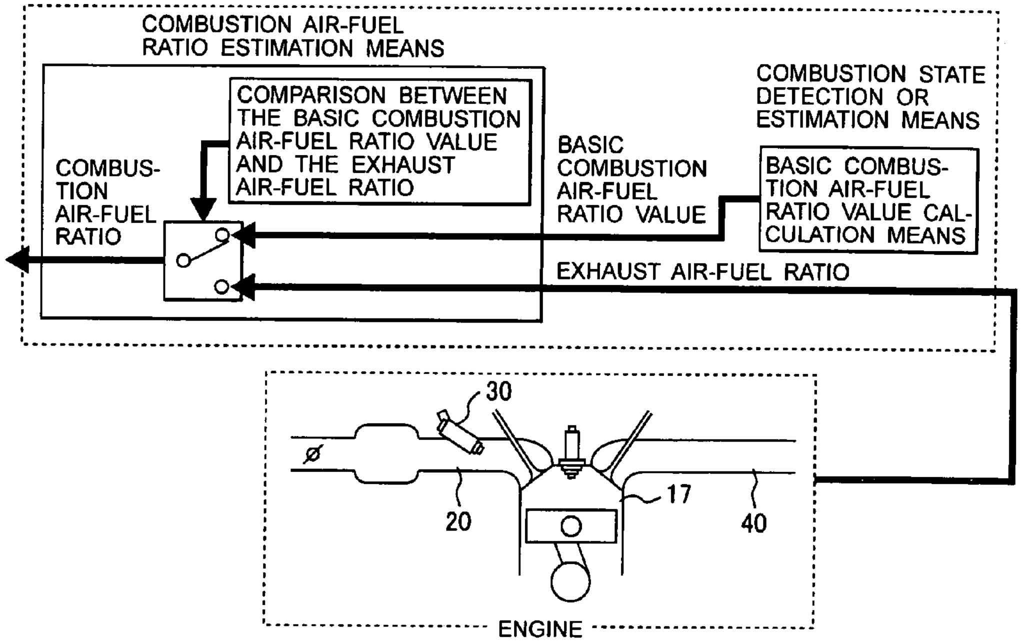
FIG. 5 is used to explain a controller in seventh and eights aspects of the present invention.
Figure 6:
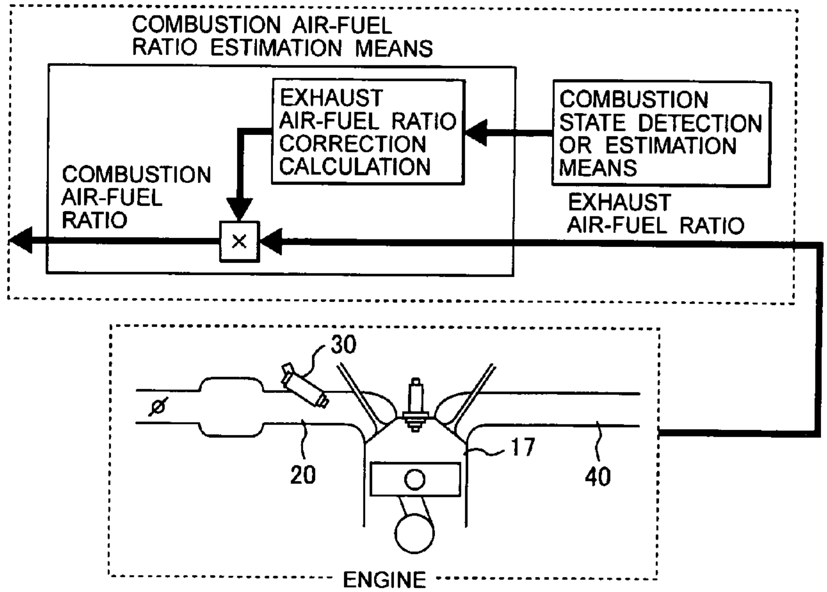
FIG. 6 is used to explain a controller in a ninth aspect of the present invention.
Figure 7:
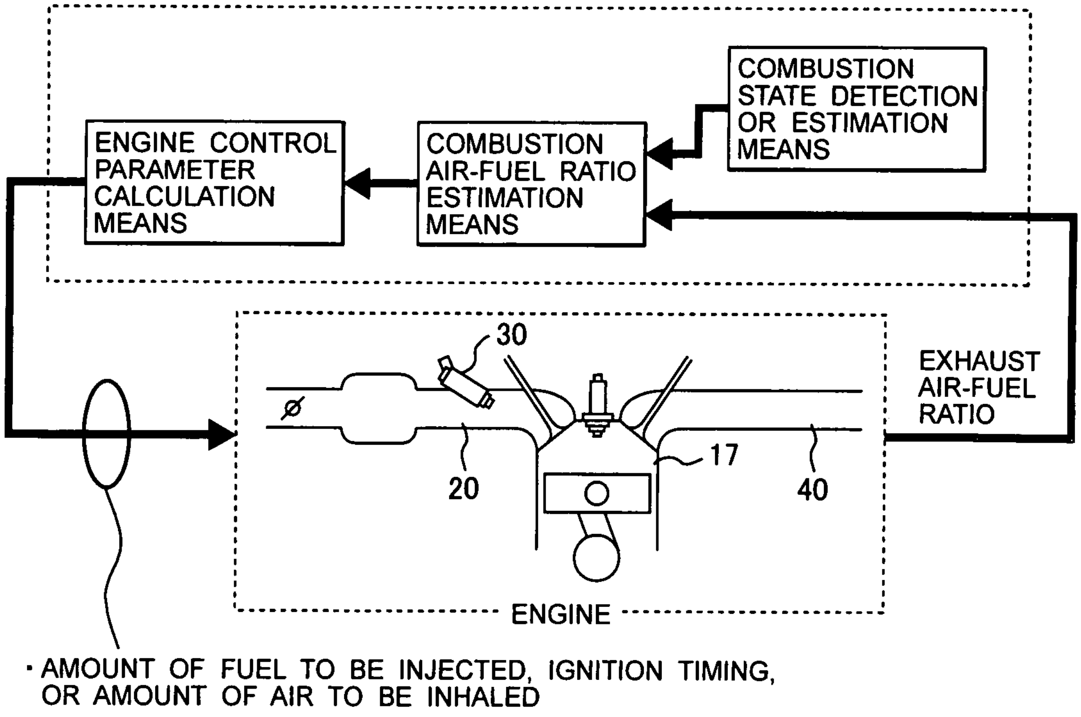
FIG. 7 is used to explain a controller in a tenth aspect of the present invention.
Figure 8:
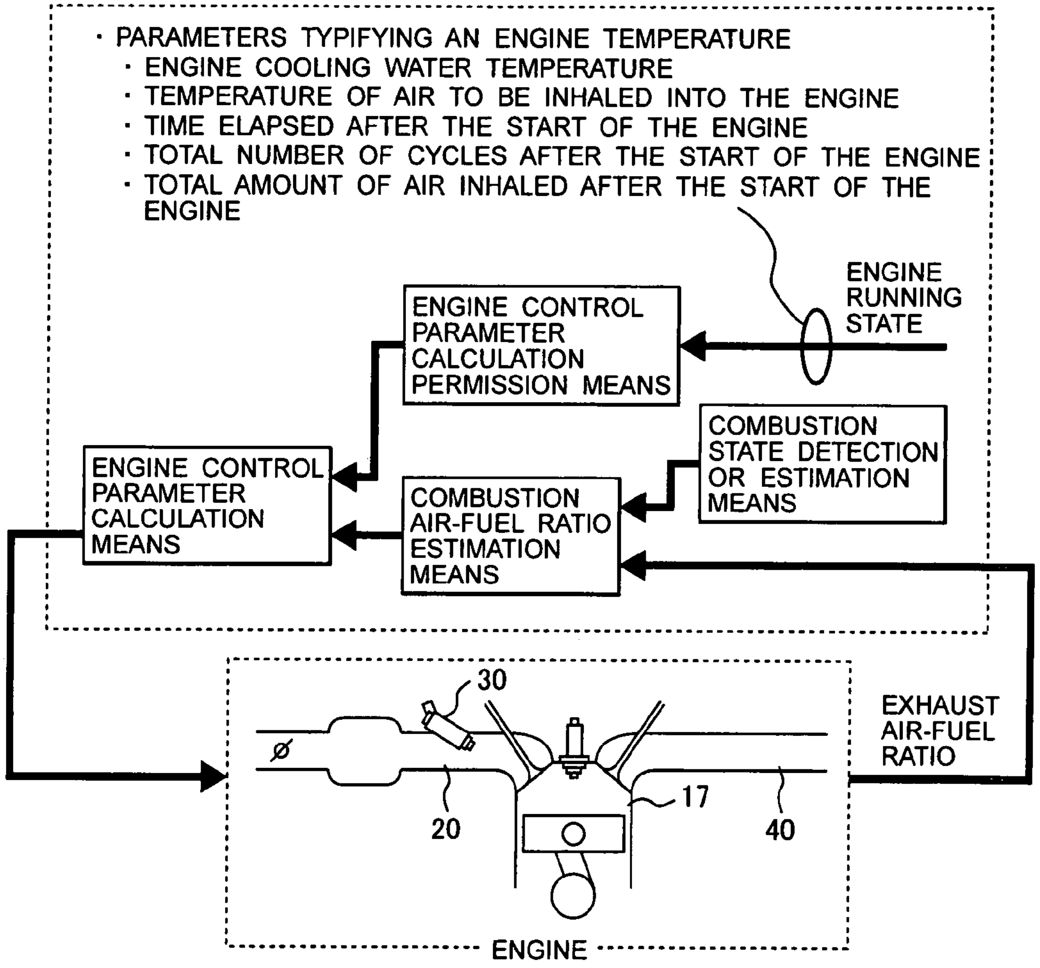
FIG. 8 is used to explain a controller in eleventh to thirteenth aspects of the present invention.
Figure 9:
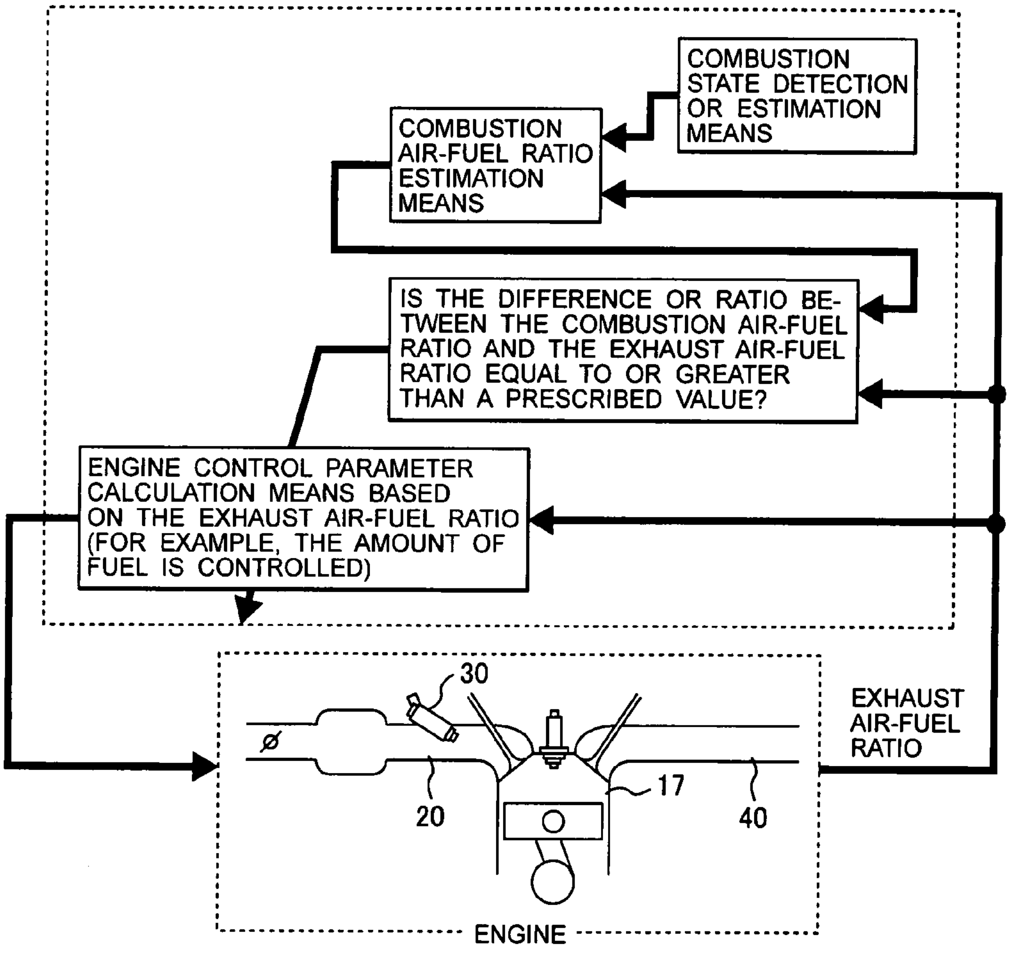
FIG. 9 is used to explain a controller in fourteenth and fifteenth aspects of the present invention.
Figure 10:
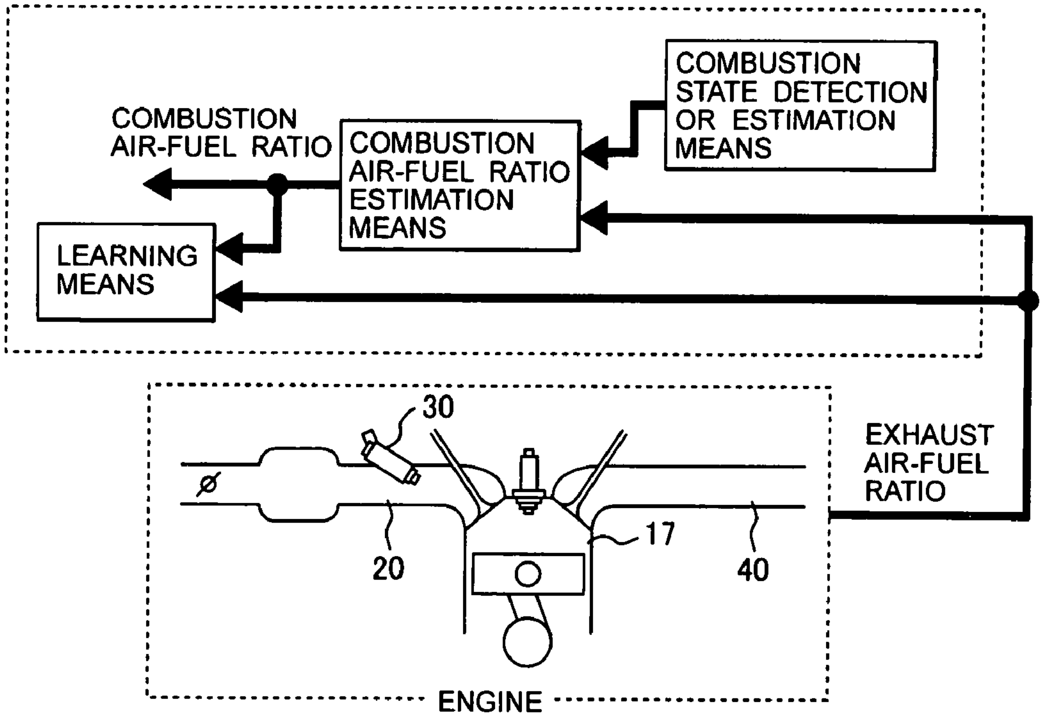
FIG. 10 is used to explain a controller in a sixteenth aspect of the present invention.
Figure 11:
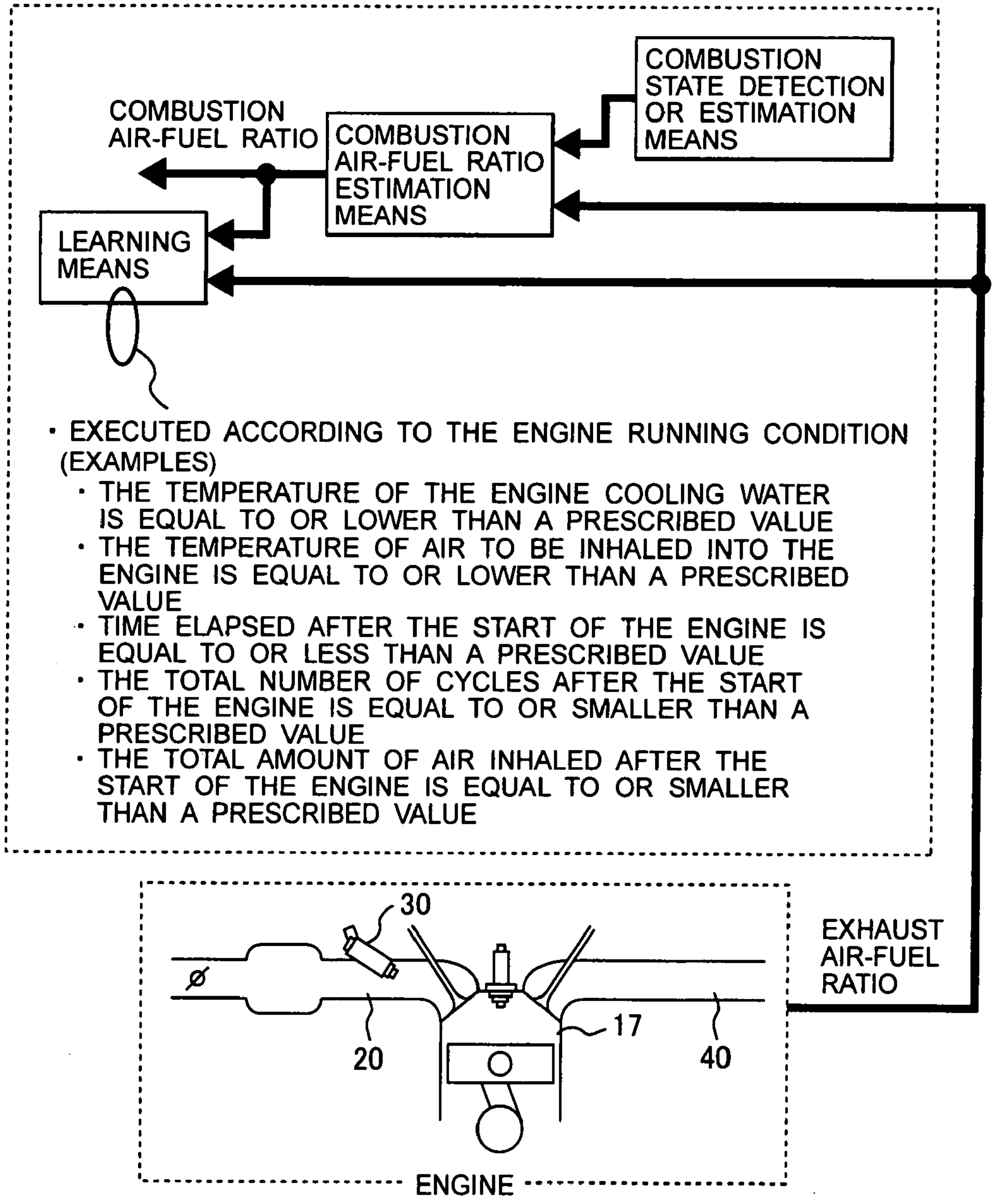
FIG. 11 is used to explain a controller in seventeenth and eighteenth aspects of the present invention.
Figure 12:
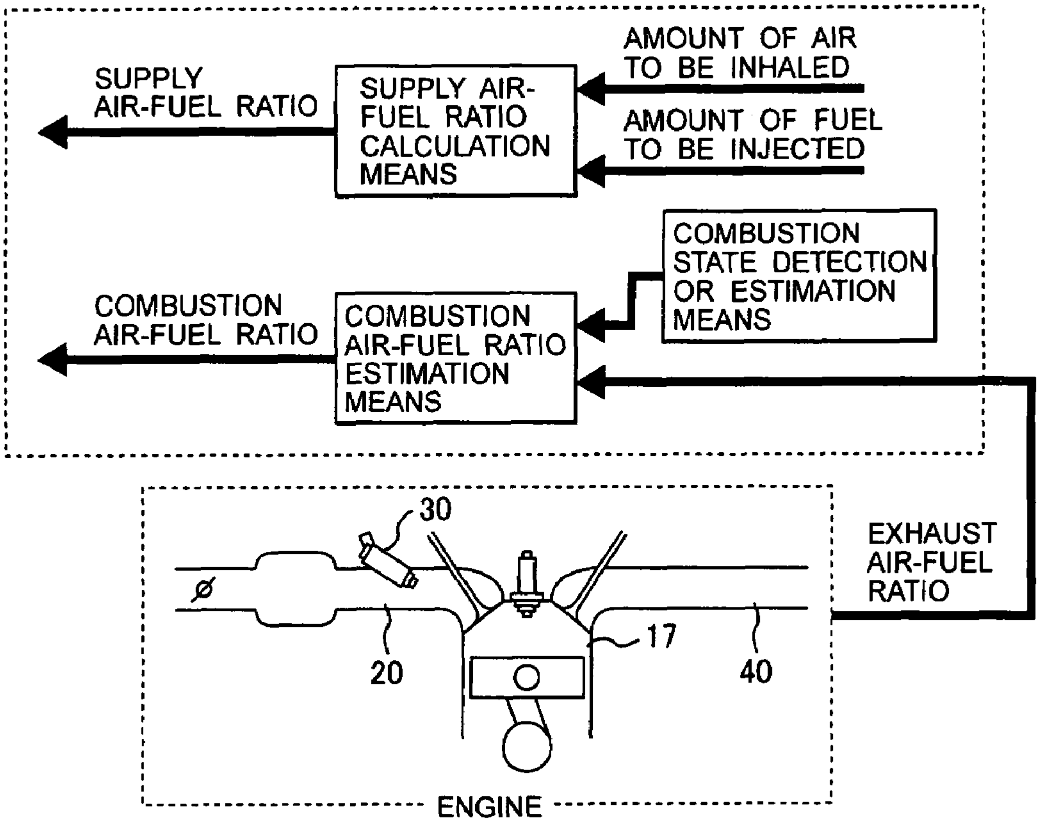
FIG. 12 is used to explain a controller in a nineteenth aspect of the present invention.
Figure 13:
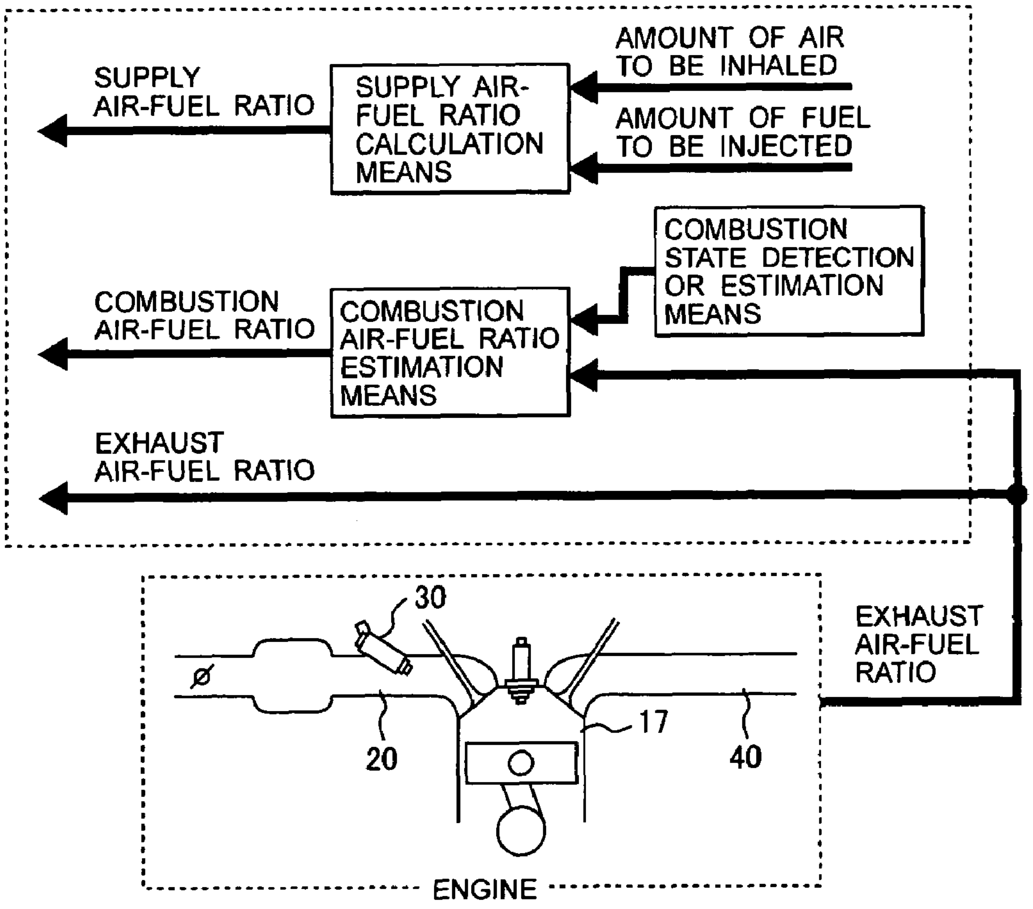
FIG. 13 is used to explain a controller in a twentieth aspect of the present invention.
Figure 14:
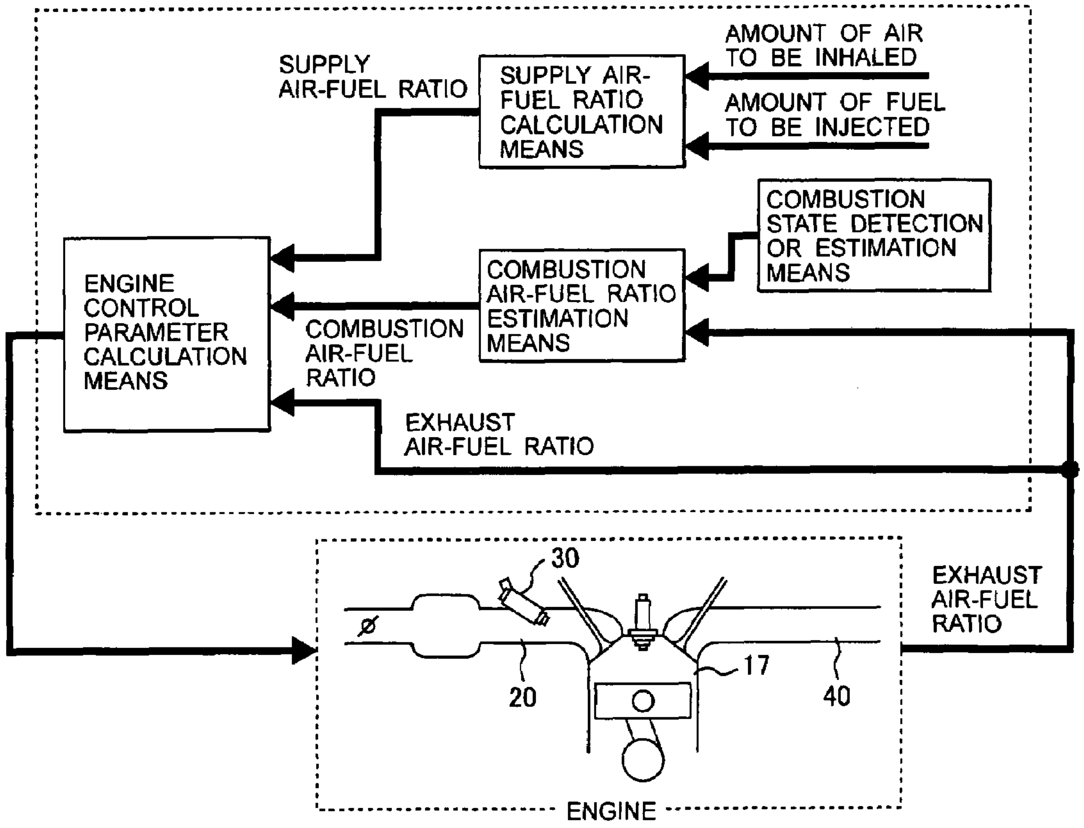
FIG. 14 is used to explain a controller in a twenty-first aspect of the present invention.
Figure 15:
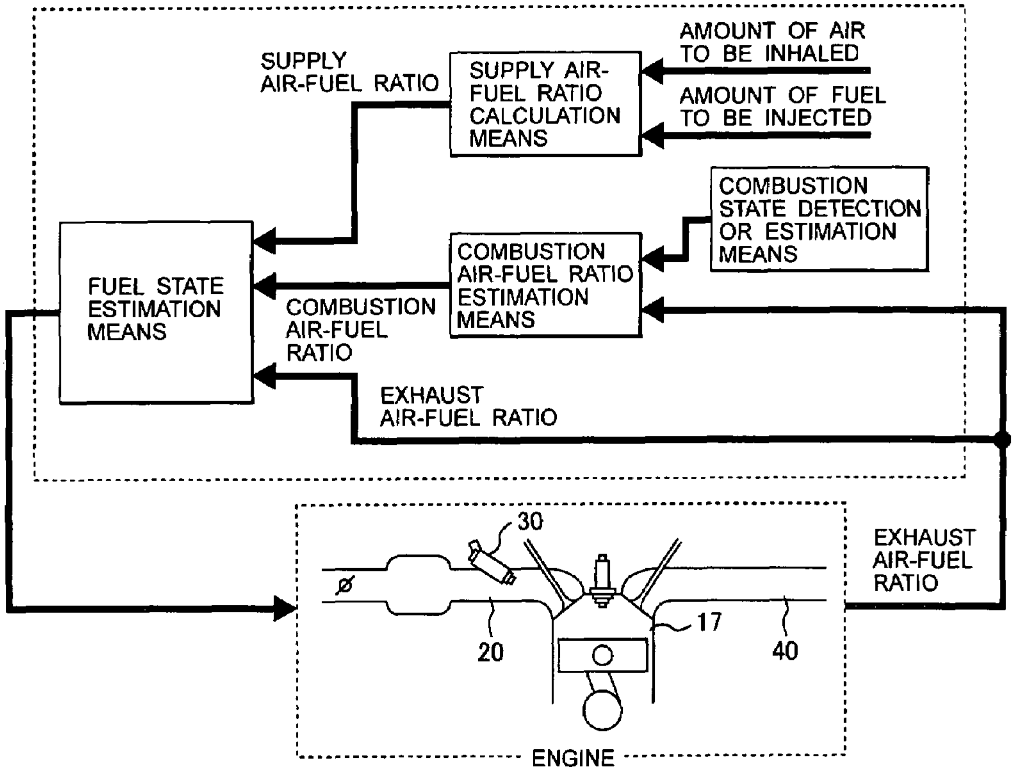
FIG. 15 is used to explain a controller in a twenty-second aspect of the present invention.
Figure 16:
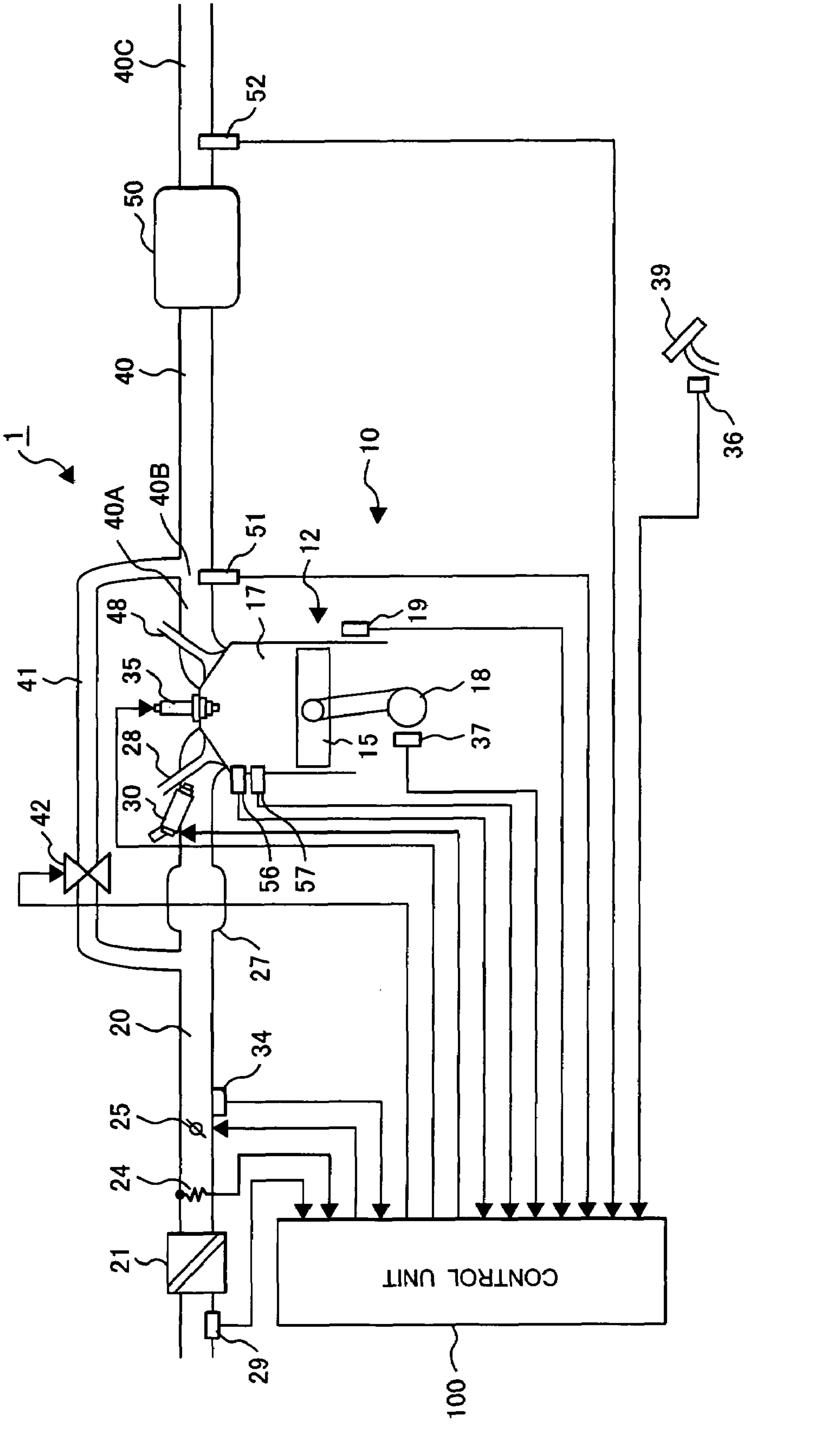
FIG. 16 schematically shows an engine to which an embodiment of the controller according to the present invention is applied.

FIG. 16 schematically shows the embodiment (common to first to seventh examples) of the inventive engine controller together with a vehicle-mounted engine to which the embodiment is applied.

The engine 10 shown in the drawing is a multi-cylinder engine having, for example, four cylinders 1 to 4. The engine 10 has a cylinder assembly 12, which comprises cylinders 1 to 4, into each of which a piston 15 is slidably fitted. A combustion chamber 17 is formed above each of the pistons 15. An ignition plug 35 protrudes into the combustion chamber 17 of each of the cylinders 1 to 4.

Air supplied for the combustion of fuel is inhaled from an air cleaner 21 provided at the upstream end of an intake path 20, passes through an air flow sensor 24 and an electronically controller throttle valve 25, and then enters a collector 27. The air is inhaled from the collector 27 through an intake valve 28 disposed at a downstream end of the intake path 20 into the combustion chambers 17 of the cylinders 1 to 4. A fuel injection valve 30 is provided downstream (intake port) of the intake path 20.

A mixture of the air inhaled into the combustion chamber 17 and the fuel injected from the fuel injection valve 30 undergoes combustion by spark ignition by the ignition plug 35. A waste gas (exhaust) resulting from the combustion is exhausted from the combustion chamber 17 through an exhaust valve 48 into an individual path 40A forming an upstream part of an exhaust path 40. The gas then passes from the individual path 40A through an exhaust collector 40B and enters a three-way catalyst 50, in which the gas is purified, the three-way catalyst 50 being provided in the exhaust path 40. The purified gas is exhausted into the outside.

An oxygen sensor 52 is provided downstream of the three-way catalyst 50 in the exhaust path 40, and an air-fuel ratio sensor 51 is provided as an exhaust sensor for sensing the exhaust air-fuel ratio in the exhaust collector 40B disposed upstream of the catalyst 50 in the exhaust path 40.

The air-fuel ratio sensor 51 has a linear output characteristic with respect to the density of the oxygen included in the exhaust. The relation between the oxygen density in the exhaust and the air-fuel ratio is approximately linear. Therefore, it is possible to obtain the exhaust air-fuel ratio in the exhaust collector 40B from the air-fuel ratio sensor 51 for detecting the oxygen density. A control unit 100 described below obtains the exhaust air-fuel ratio upstream of the three-way catalyst 50 from a signal from the air-fuel ratio sensor 51. The control unit 100 also obtains the oxygen density downstream of the three-way catalyst 50 from the oxygen sensor 52, or determines whether the air-fuel ratio is rich or lean compared with the stoichiometry. The outputs from the air-fuel ratio sensor 51 and oxygen sensor 52 are used to perform F/B control in which the amount of fuel to be injected or the amount of air is corrected successively so that the purifying efficiency of the three-way catalyst 50 is optimized.

Part of the exhaust gas ejected from the combustion chamber 17 to the exhaust path 40 is brought into the intake path 20 through an exhaust gas recirculation (EGR) path 41 and then returned to the combustion chamber 17 of each cylinder through a branch path of the intake path 20, as necessary. An EGR valve 42 for adjusting an EGR ratio is provided in the EGR path 41.

A controller 1 in this embodiment has a control unit 100 incorporating a microprocessor so as to perform various types of control for the engine 10.

Figure 17:
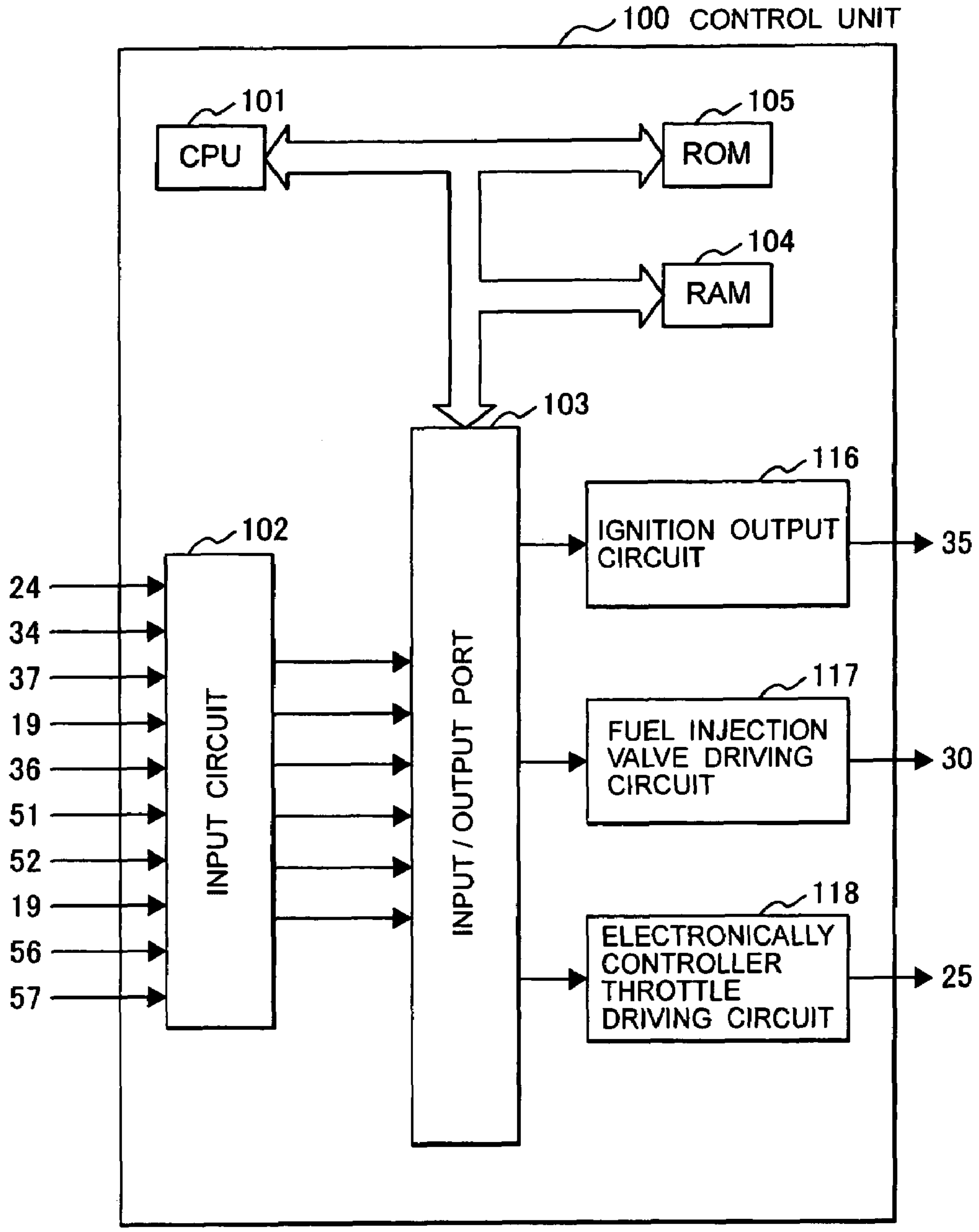
FIG. 17 shows the internal structure of the control unit shown in FIG. 16.

Basically, the control unit 100 comprises a CPU 101, an input circuit 102, an input/output port 103, a RAM 104, and a ROM 105, as shown in FIG. 17.

Input signals supplied to the control unit 100 include a signal responsive to the amount of air to be inhaled, which is detected by the air flow sensor 24; a signal responsive to the opening of the throttle valve 25, which is detected by a throttle sensor; a signal indicating the rotation (engine revolutions) and phase of a crank shaft 18, which is obtained from a crank angle sensor (revolutions sensor) 37 (the crank angle sensor 37 outputs a signal pulse at intervals of, for example, one degree of rotational angle); a signal indicating the oxygen density downstream of the three-way catalyst 50 or determining whether the air-fuel ratio is rich or lean compared with the stoichiometry, which is obtained from the oxygen sensor 52 disposed downstream of the three-way catalyst 50 in the exhaust path 40; a signal responsive to the oxygen density (air-fuel ratio) detected by the air-fuel ratio sensor 51 disposed in the exhaust collector 40B upstream of the three-way catalyst 50 in the exhaust path 40; a signal responsive to an engine cooling water temperature detected by a water temperature sensor 19 attached to the cylinder 12; a signal responsive to the amount of depression of an accelerator pedal 39 (indicating a torque demanded by the driver), which is obtained from an accelerator sensor 36; a signal responsive to the pressure in each cylinder (in the combustion chamber 17), which is obtained from an intra-cylinder pressure sensor 56; and a signal responsive to the temperature in each cylinder (in the combustion chamber 17), which is obtained from an intra-cylinder temperature sensor 57.

The control unit 100 accepts outputs from the air-fuel ratio sensor 51, oxygen sensor 52, throttle sensor, air flow sensor 24, crank angle sensor 37, water temperature sensor 19, accelerator sensor 36, intra-cylinder pressure sensor 56, intra-cylinder temperature sensor 57, and so on. The control unit 100 recognizes the running state of the engine from these outputs, and calculates the amount of air to be inhaled, the amount of fuel to be injected, and an ignition timing, which are main amounts for operating the engine, according to the running state. The fuel injection amount calculated by the control unit 100 is converted to an open valve pulse signal and the converted signal is sent from a fuel injection valve driving circuit 117 to the fuel injection valve 30. A driving signal is sent from an ignition output circuit 116 to the ignition plug 35 so that ignition occurs at the ignition timing calculated by the control unit 100.

More specifically, in the control unit 100, signal processing such as noise removal is performed in the input circuit 102, and then the processed signals are sent to the input/output port 103. The values received by the input port are stored in the RAM 104 and the CPU 101 performs calculation on these values. A control program in which the calculation processing is coded is prewritten to the ROM 105. Values calculated according to the control program, each of which represents the amount of actuator operation, are stored in the RAM 104 and then output to the output port 103.

As the driving signal for the ignition plug 35, an on/off signal is set, the signal being in the on state while the primary coil in the ignition output circuit 116 is energized and in the off state while not energized. Ignition occurs when the on state changes to the off state. The signal set in the output port 103 for the ignition plug 35 is amplified to energy sufficient for ignition in the ignition output circuit 116, and then supplied to the ignition plug 35. As the driving signal (open valve pulse signal) for the fuel injection valve 30, an on/off signal is set, the signal being turned on when the valve is opened and turned off when the valve is closed. The on/off signal is amplified to energy sufficient to open the fuel injection valve 30 in the fuel injection valve driving circuit 117, and then supplied to the fuel injection valve 30. A driving signal for achieving a target opening of the electronically controller throttle valve 25 is sent through the electronically controller throttle driving circuit 118 to the electronically controller throttle valve 25.

Next, the processing executed by the control unit 100 will be specifically described.

First Example (1A)

FIG. 18

Figure 18:
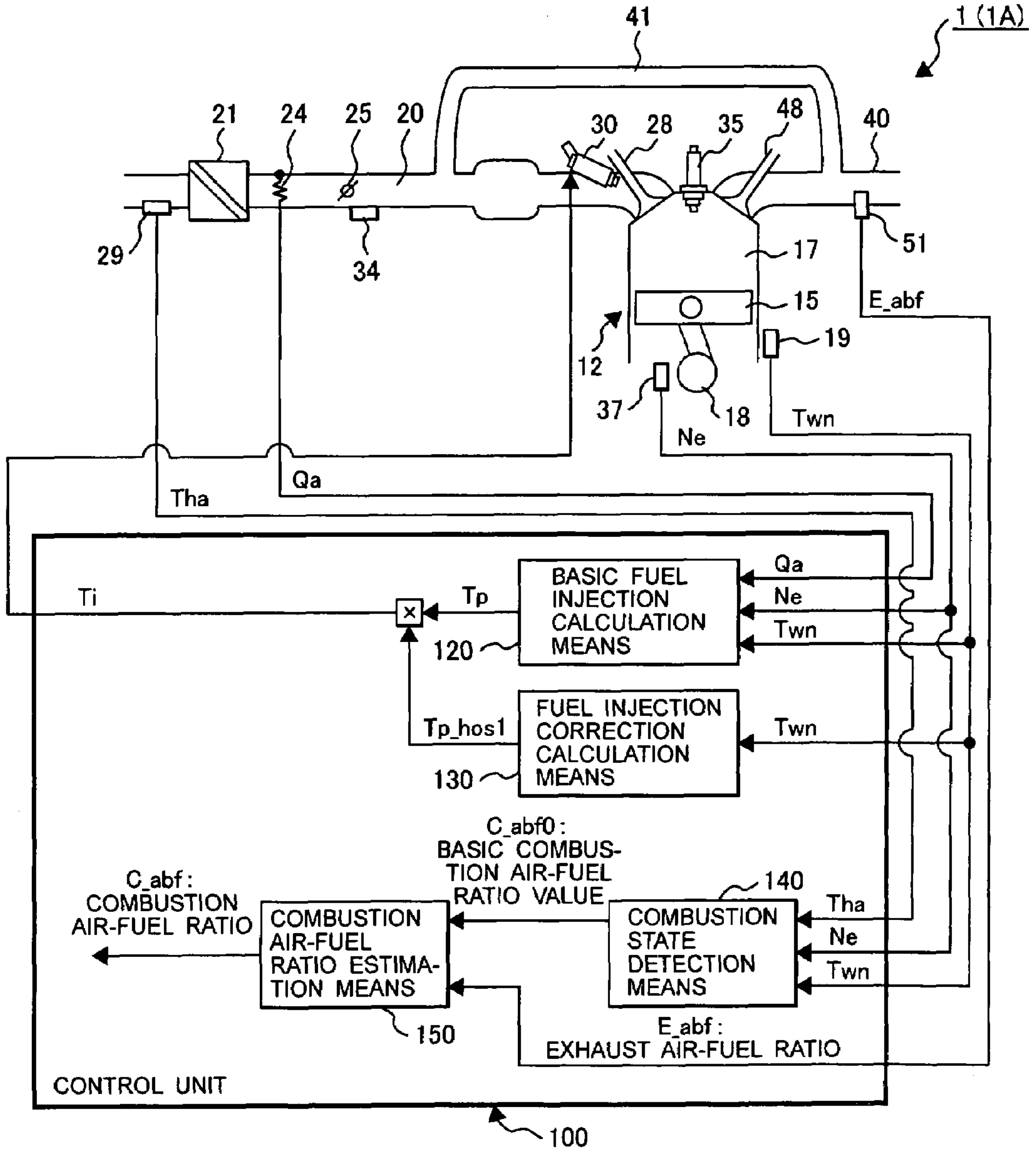
FIG. 18 shows a control system in a first example.

FIG. 18 shows a control system indicating a controller 1A in a first example. The controller 1A comprises a basic fuel injection calculation means 120, a fuel injection correction calculation means 130, a combustion state detection means 140, and a combustion air-fuel ratio estimation means 150. The amount Ti of fuel to be injected is calculated by multiplying the basic amount Tp of fuel to be injected by Tp_hos1 obtained from calculation by the fuel injection correction calculation means 130, so that the combustion air-fuel ratios of all cylinders become desired air-fuel ratios. The value of Tp_hos1 calculated by the fuel injection correction calculation means 130 is such that the combustion air-fuel ratio becomes the desired air-fuel ratio (near the stoichiometry), particularly in an area in which the fuel vaporization rate at the time of start is low. The combustion state detection means 140 calculates a basic combustion air-fuel ratio value from a variation in rotation. The combustion air-fuel ratio estimation means 150 calculates the combustion air-fuel ratio from the basic combustion air-fuel ratio value and exhaust air-fuel ratio.

The basic fuel injection calculation means 120, fuel injection correction calculation means 130, combustion state detection means 140, and combustion air-fuel ratio estimation means 150 will be described below in detail.

Figure 19:
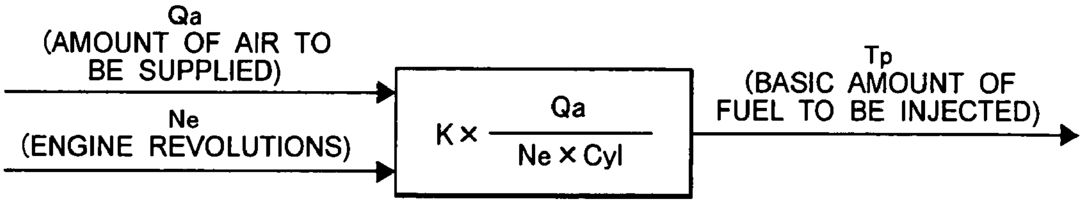
FIG. 19 is used to explain the basic fuel injection calculation means shown in FIG. 18.

<Basic Fuel Injection Calculation Means 120 (FIG. 19)>

The basic fuel injection calculation means 120 calculates the amount of fuel to be injected that achieves a target torque and target air-fuel ratio at the same time in an arbitrary running condition, according to the amount of air to be inhaled into the engine. Specifically, as shown in FIG. 18, the basic fuel injection amount Tp is calculated. Cyl indicates the number of cylinders, which is 6 in this example. K is determined according to the specifications (the relation between the fuel injection pulse width and the amount of fuel to be injected) of the fuel injection valve (injector) 30.

<Fuel Injection Correction Calculation Means 130 (FIG. 20)>

Figure 20:
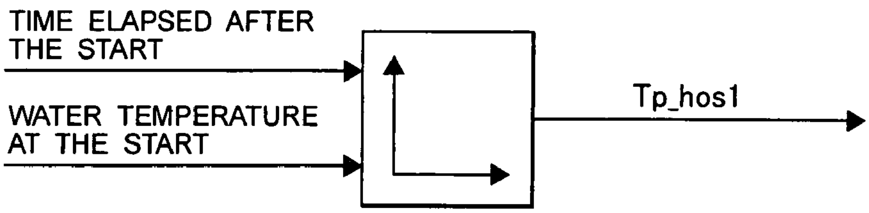
FIG. 20 is used to explain the fuel injection correction calculation means shown in FIG. 18.

The fuel injection correction calculation means 130 calculates the amount Tp_hos1 of fuel injection to be corrected. Particularly, the calculation is performed so that the combustion air-fuel ratio becomes the desired air-fuel ratio (near the stoichiometry) in an area in which the fuel vaporization rate at the time of start is low. Specifically, as shown in FIG. 20, the calculation is performed according to the time elapsed from the start time and the water temperature at the start time. Since Tp_hos1 is calculated so as to compensate the fuel vaporization rate, its initial value is determined depending on the water temperature at the start time and gradually decreases with the time elapsed.

<Combustion State Detection Means 140 (FIG. 21)>

Figure 21:
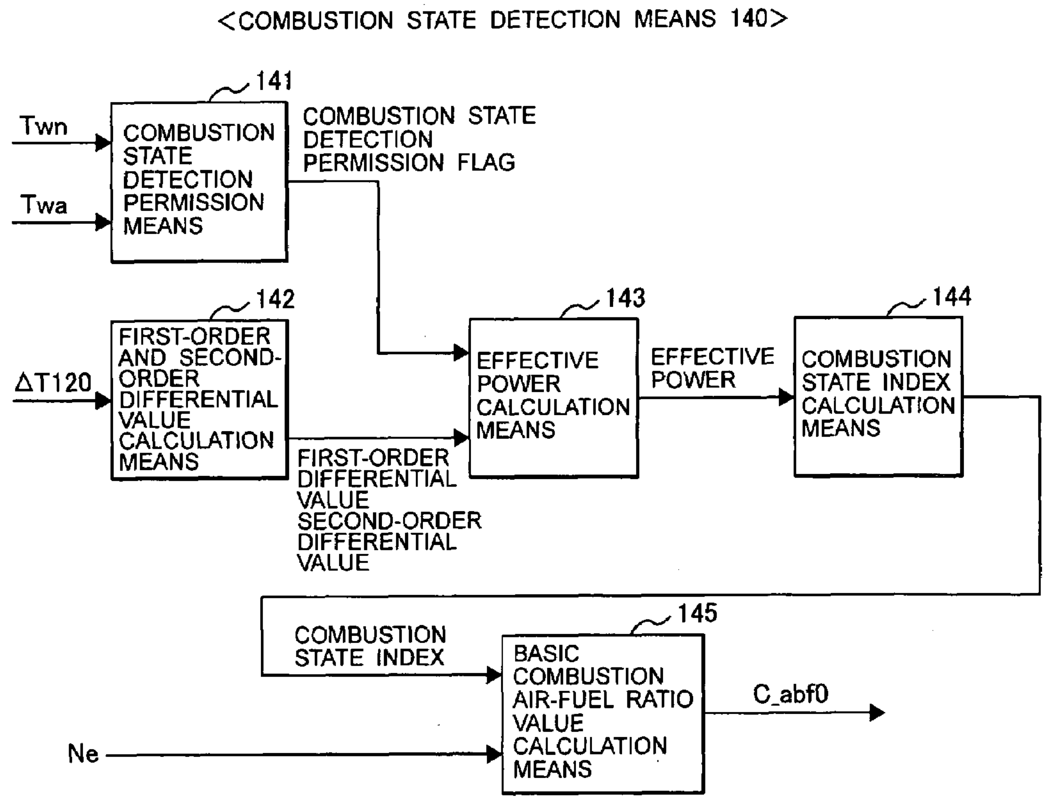
FIG. 21 is used to explain the combustion state detection means shown in FIG. 18.

FIG. 21 shows the combustion state detection means 140. The combustion state detection means 140 comprises a combustion state detection permission means 141, a first-order and second-order differential value calculation means 142, an effective power calculation means 143, a combustion state index calculation means 144, and a basic combustion air-fuel ratio value calculation means 145. The combustion state detection permission means 141 determines whether to detect the combustion state from the variation in rotation. The first-order and second-order differential value calculation means 142 calculates first-order and second-order differential values of time ΔT120 taken between pulses at intervals of 120 degrees. In practice, since the calculation is performed by a microprocessor, differences are taken. When a combustion state detection permission flag is 1, prescribed processing is performed on the first-order and second-order differential values, and an effective power, combustion state index, and basic combustion air-fuel ratio value are calculated in that order.

Processing on each block will be described below in detail.

<First-Order and Second-Order Differential Value Calculation Means 142 (FIG. 22)>

Figure 22:
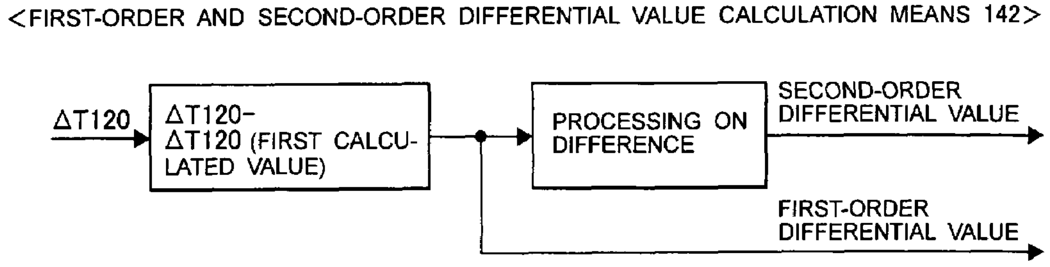
FIG. 22 is used to explain the first-order and second-order differential value calculation means shown in FIG. 21.

The first-order and second-order differential value calculation means 142 calculates first-order and second-order differential values of time ΔT120 taken between pulses at intervals of 120 degrees. Specifically, in practice, since the calculation is performed by a microprocessor, differences are taken, as shown in FIG. 22.

<Combustion State Detection Permission Means 141 (FIG. 23)>

Figure 23:
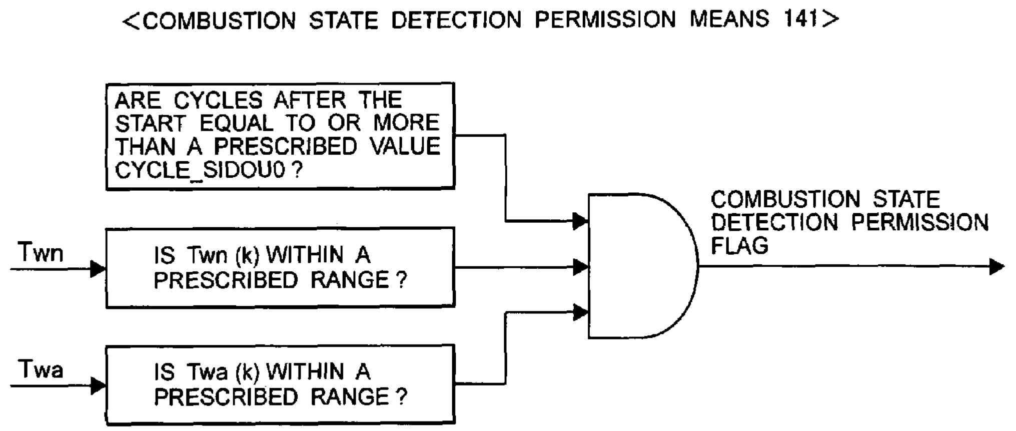
FIG. 23 is used to explain the combustion state detection permission means shown in FIG. 21.

The combustion state detection permission means 141 performs operations to set the combustion state detection permission flag. Specifically, as shown in FIG. 23, the combustion state detection permission means 141 sets the combustion state detection permission flag to 1 to detect the combustion state when cycles after the start are equal to or more than a prescribed value Cycle_sidou0, a cooling water temperature Twn(k) is within a prescribed range, and an intake temperature Twa(k) is within a prescribed range. If any of these conditions is not met, detection of the combustion state is not permitted, setting the combustion state detection permission flag to 0. The value of Cycle_sidou0 is preferably determined according to the performance of the engine. A value is preferably set according to the purpose, for example, to detect the combustion state from a first explosion, after the completion of an explosion, or after peak revolutions are reached. This is also true for the cooling water temperature and intake temperature. To detect an effect by the fuel state, a value is preferably set within an area in which there is a difference in the fuel vaporization rate, as shown in example 7.

<Effective Power Calculation Means 143 (FIG. 24)>

Figure 24:
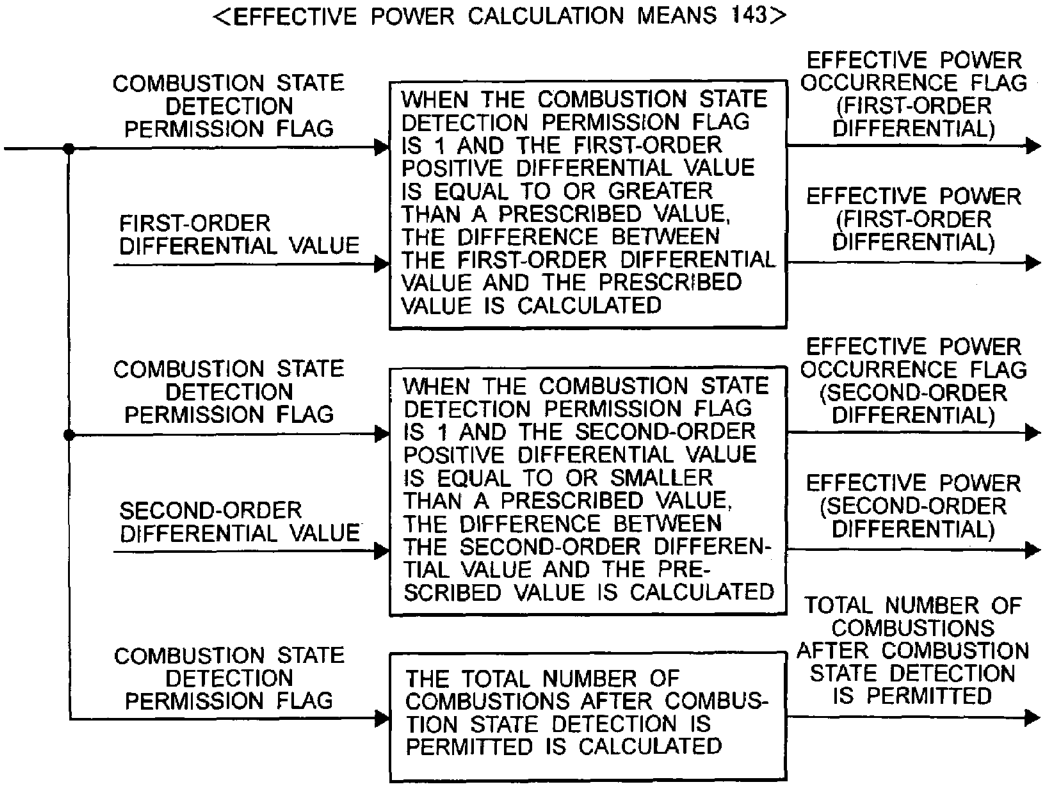
FIG. 24 is used to explain the effective power calculation means shown in FIG. 21.

The effective power calculation means 143 calculates effective power for a positive first-order differential value and effective power for a negative second-order differential value, as shown in FIG. 24.

When the combustion state detection permission flag is 1 and the first-order differential value is equal to or greater than a prescribed value, an effective power generation flag (first-order differential) is set to 1 and the difference between the first-order differential value and a prescribed value is taken as effective power (first differential). When the combustion state detection permission flag is 1 and the second-order differential value is equal to or smaller than a prescribed value, another effective power generation flag (second-order differential) is set to 1 and the difference between the second-order differential value and a prescribed value is taken as effective power (second differential).

Each time this processing is initiated after the combustion state detection permission flag is set to 1, the total number of combustions after the combustion state detection permission is calculated by incrementing the total number of combustions after the detection permission by one.

Although the effective power is obtained from a difference (relative value) from a threshold, an absolute value may be used.

<Combustion State Index Calculation Means (First-Order Differential Value) 144 (FIG. 25)>

Figure 25:
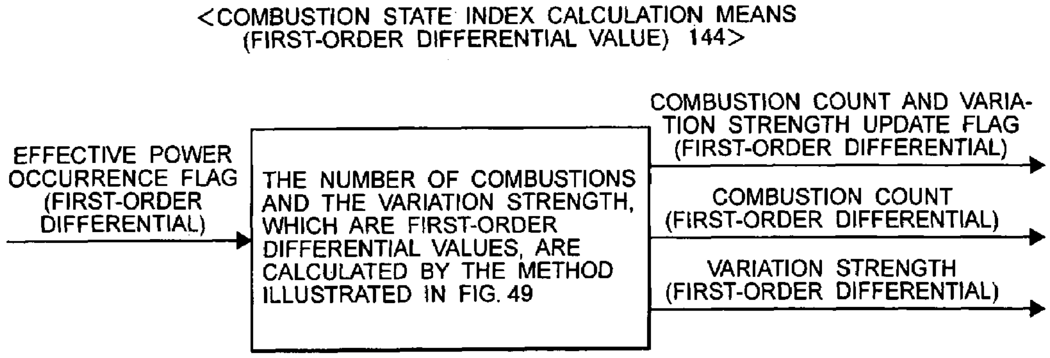
FIG. 25 is used to explain the combustion state index calculation means (first-order differential value) shown in FIG. 21.
Figure 49:
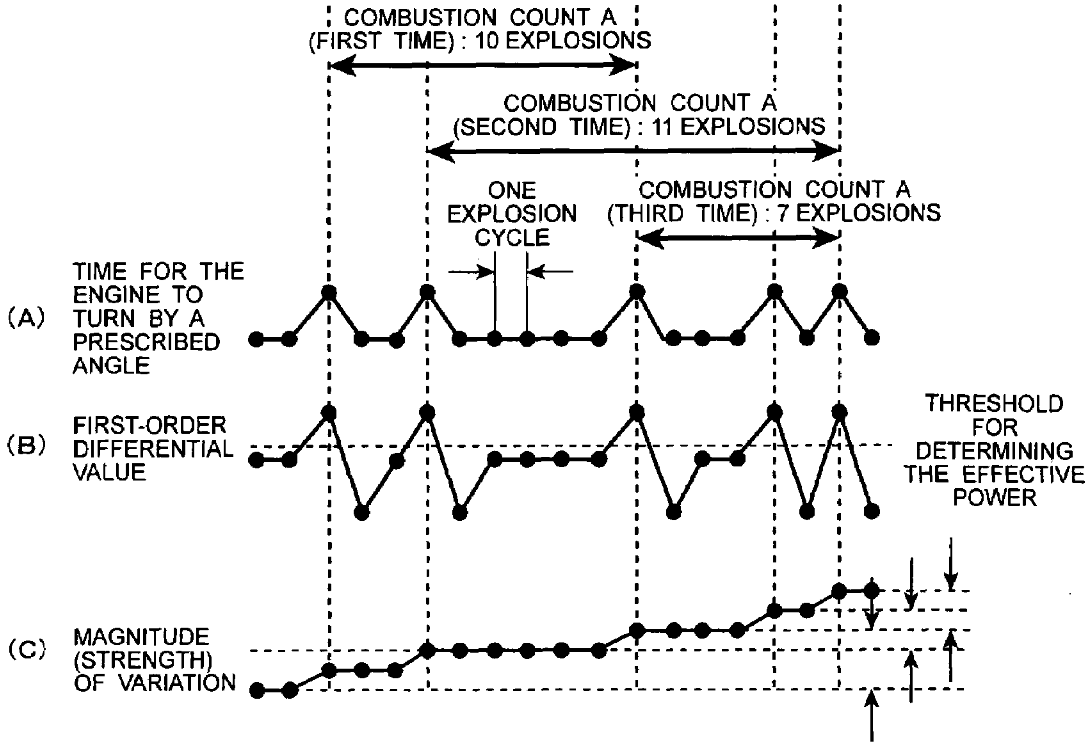
FIG. 49 is used to explain the combustion state index calculation means (first-order differential value) shown in FIG. 25.

The combustion state index calculation means 144 calculates a frequency of rotation variation occurrences and a variation strength according to the effective power of the first-order differential value. Specifically, as shown in FIG. 25, when an effective power occurrence flag (first-order differential) is 1, the combustion state index calculation means 144 performs calculation to set a combustion count and variation strength update flag (first-order differential), and calculates a combustion count (first-order differential) and variation strength (first-order differential). These calculations are performed by a method as illustrated in FIG. 49. When the effective power occurrence flag (first-order differential) is 1 and the number of effective power occurrences (first-order differential) is 3 or more, the combustion count and variation strength (first-order differential) update flag is set to 1.

<Combustion State Index Calculation Means (Second-Order Differential Value) 144' (FIG. 26)>

Figure 26:
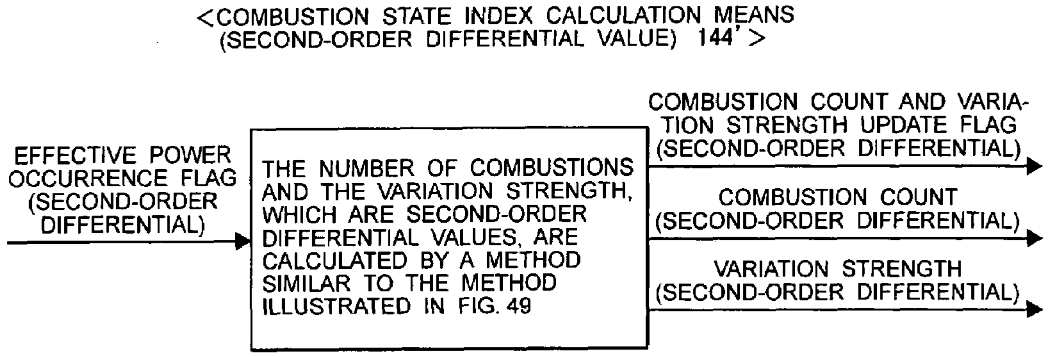
FIG. 26 is used to explain the combustion state index calculation means (second-order differential value) shown in FIG. 21.

The combustion state index calculation means 144' calculates a frequency of rotation variation occurrences and a variation strength according to the effective power of the second-order differential value. Specifically, as shown in FIG. 26, when an effective power occurrence flag (second-order differential) is 1, the combustion state index calculation means 144 performs calculation to set a combustion count and variation strength update flag (second-order differential), and calculates a combustion count (second-order differential) and variation strength (second-order differential). These calculations are performed in the same way as in the case of the first-order differential value illustrated in FIG. 49. When the effective power occurrence flag (second-order differential) is 1 and the number of effective power occurrences (second-order differential) is 3 or more, the combustion count and variation strength (second-order differential) update flag is set to 1.

Figure 27:
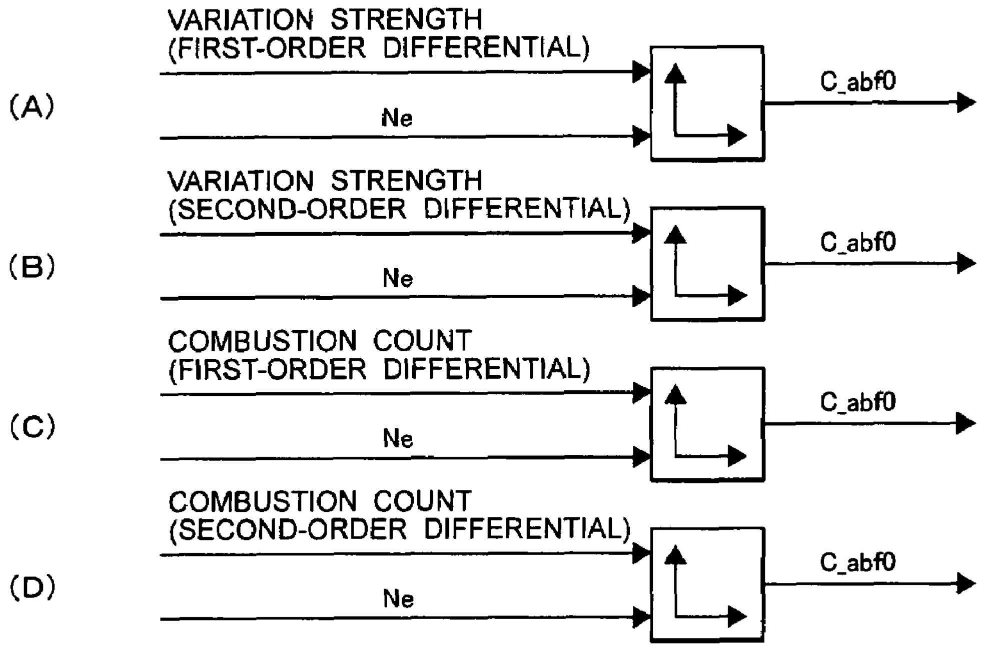
FIG. 27 is used to explain the basic combustion air-fuel ratio value calculation means in the combustion state detection means shown in FIG. 21.

<Basic Combustion Air-Fuel Ratio Value Calculation Means 145 (FIG. 27)>

The basic combustion air-fuel ratio value calculation means 145 calculates a basic combustion air-fuel ratio value C_abf0 according to the above combustion state index. Specifically, as shown by (A) to (D) in FIG. 27, C_abf0 is obtained from, for example, the variation strength (first-order differential) and revolutions Ne. The reason why the revolutions Ne are referenced is that the correlation between the variation strength (first-order differential) and the combustion air-fuel ratio changes according to the revolutions Ne. Alternatively, C_abf0 may be obtained from the variation strength (second-order differential) and the revolutions Ne, C_abf0 may be obtained from the variation strength (second-order differential) and the revolutions Ne, or C_abf0 may be obtained from the combustion count (second-order differential) and the revolutions Ne. The largest (lean value) of the C_abf0 values may be selected.

<Combustion Air-Fuel Ratio Estimation Means 150 and 150' (FIGS. 28 and 29)>

Figure 28:
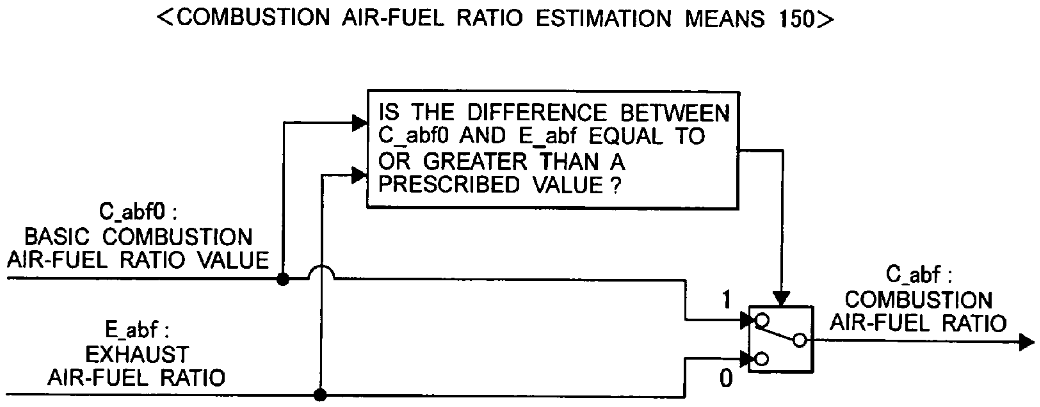
FIG. 28 is used to explain an example of the combustion air-fuel ratio estimation means shown in FIG. 18.

The combustion air-fuel ratio estimation means 150 and 150' calculate the combustion air-fuel ratio C_abf according to the above basic combustion air-fuel ratio value. Specifically, as shown in FIG. 28 (combustion air-fuel ratio estimation means 150), when the difference between the basic combustion air-fuel ratio value C_abf0 and the exhaust air-fuel ratio E_abf is equal to or greater than a prescribed value, that is, the basic combustion air-fuel ratio value C_abf0 is leaner than the exhaust air-fuel ratio E_abf by the prescribed value or more, the value of the exhaust air-fuel ratio E_abf is determined to have no validity due to, for example, the effect by unburned fuel and the basic combustion air-fuel ratio value C_abf0 is regarded as the combustion air-fuel ratio C_abf. When the difference between the basic combustion air-fuel ratio value C_abf0 and the exhaust air-fuel ratio E_abf is smaller than the prescribed value, the value of the exhaust air-fuel ratio E_abf is determined to have validity and the exhaust air-fuel ratio E_abf is regarded as the combustion air-fuel ratio C_abf.

Figure 29:
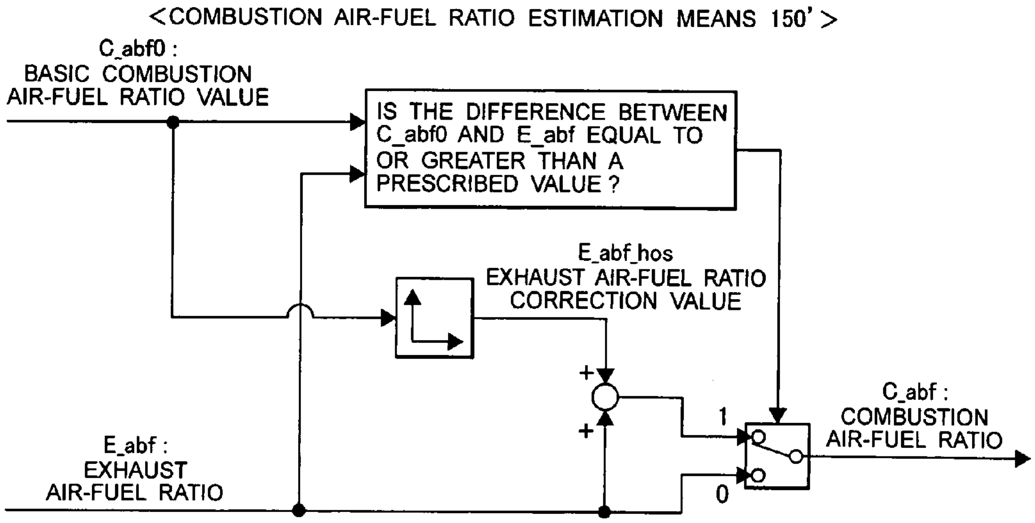
FIG. 29 is used to explain another example of the combustion air-fuel ratio estimation means shown in FIG. 18.

Alternatively, the combustion air-fuel ratio C_abf may be obtained by a method as illustrated in FIG. 29 (combustion air-fuel ratio estimation means 150'). Specifically, when the difference between the basic combustion air-fuel ratio value C_abf0 and the exhaust air-fuel ratio E_abf is equal to or greater than the prescribed value, a value obtained by adding an exhaust air-fuel ratio correction value E_abf_hos to the exhaust air-fuel ratio E_abf is regarded as the combustion air-fuel ratio C_abf. That is, when the basic combustion air-fuel ratio value C_abf0 is leaner than the exhaust air-fuel ratio E_abf by the prescribed value or more, the value of the exhaust air-fuel ratio E_abf is determined to have no validity due to, for example, the effect by unburned fuel. The exhaust air-fuel ratio E_abf is then corrected and the corrected value is regarded as the combustion air-fuel ratio C_abf. The value used for correction is obtained from the basic combustion air-fuel ratio value C_abf0, which is considered to be a more accurately detected combustion air-fuel ratio.

When the difference between the basic combustion air-fuel ratio value C_abf0 and the exhaust air-fuel ratio E_abf is smaller than the prescribed value, the value of the exhaust air-fuel ratio E_abf is determined to have validity and the exhaust air-fuel ratio E_abf is regarded as the combustion air-fuel ratio C_abf, as in FIG. 28.

Second Example (1B)

FIG. 30

Although, in the first example, a variation in rotation is detected to handle it as the combustion state having a correlation to the combustion air-fuel ratio, an intra-cylinder is detected to handle it as the combustion state having a correlation to the combustion air-fuel ratio, in this example.

Figure 30:
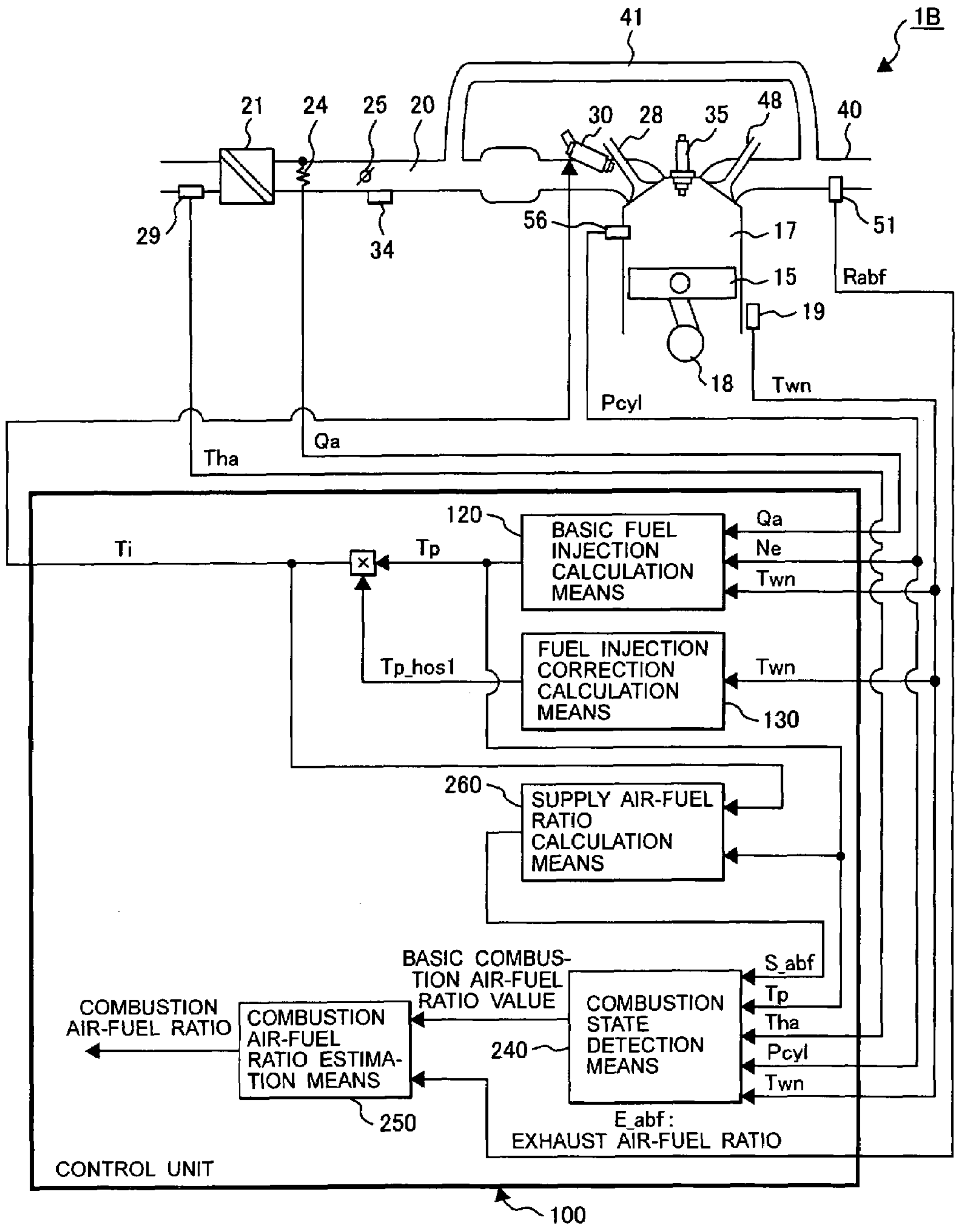
FIG. 30 shows a control system in a second example.

FIG. 30 shows a system indicating a controller 1B in this example. Basically, the controller 1B shown in the drawing is the same as in the first example, but the intra-cylinder pressure sensor 56 rather than the revolutions sensor 37 is used to detect the combustion state. That is, the detected value Pcyl (intra-cylinder pressure profile) of the intra-cylinder pressure sensor 56 instead of the revolutions sensor 37 is used to detect the combustion state (the basic combustion air-fuel ratio value is calculated). Furthermore, a supply air-fuel ratio calculation means 260 for calculating the supply air-fuel ratio is added. The description that follows focuses on means having structural functions different from the first example. Although being assigned a different reference numeral, each means having the same name as in the previous example has almost the same structural function, so its explanation is simplified or omitted. The means having structural functions different from the previous example will be mainly described below.

<Supply Air-Fuel Ratio Calculation Means 260 (FIG. 31)>

Figure 31:
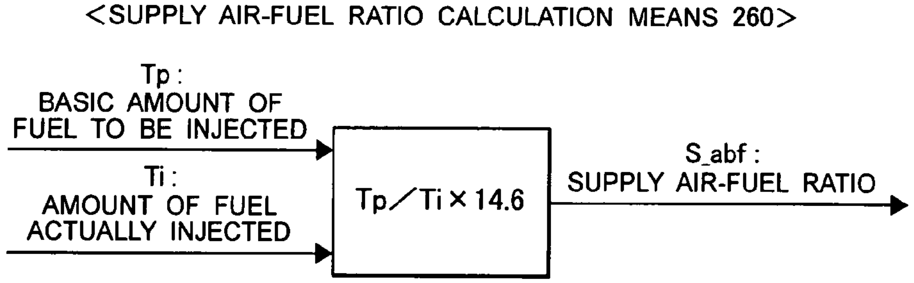
FIG. 31 is used to explain the supply air-fuel ratio calculation means shown in FIG. 30.

The supply air-fuel ratio calculation means 260 calculates the supply air-fuel ratio. Specifically, as shown in FIG. 31, the ratio of the basic amount Tp of fuel to be injected (the amount of fuel to be injected equivalent to the theoretical air-fuel ratio) to the amount Ti of fuel actually injected is multiplied by a value of 14.6 equivalent to the theoretical air-fuel ratio, and the resulting value is used as the supply air-fuel ratio S_abf.

<Combustion State Detection Means 240 (FIG. 32)>

Figure 32:
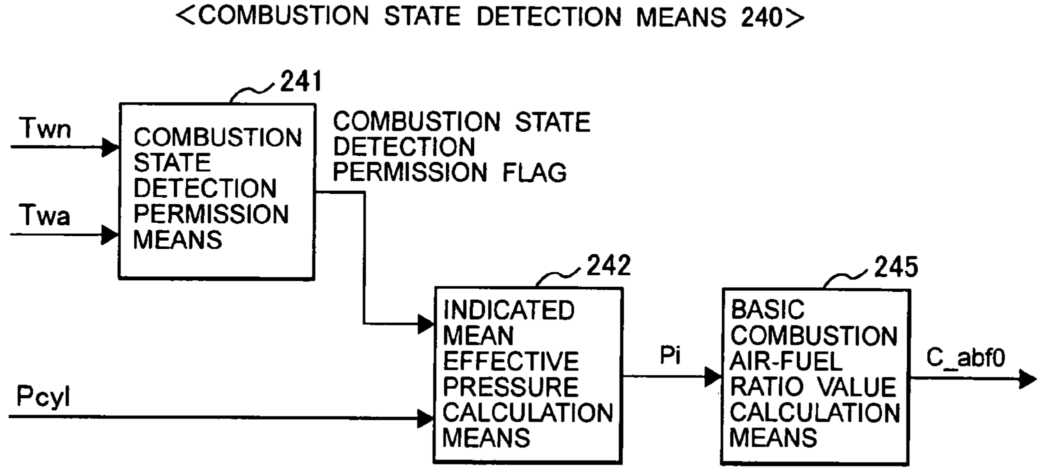
FIG. 32 is used to explain the combustion state detection means shown in FIG. 30.

FIG. 32 shows the combustion state detection means 240. The combustion state detection means 240 comprises a combustion state detection permission means 241, an indicated mean effective pressure calculation means 242, and a basic combustion air-fuel ratio value calculation means 245.

The combustion state detection permission means 241 determines whether to calculate the basic combustion air-fuel ratio value from the intra-cylinder pressure profile Pcyl. When detection is permitted, the combustion state detection permission flag is set to 1; when not permitted (denied), the flag is set to 0. The indicated mean effective pressure calculation means 242 calculates an indicated mean effective pressure Pi from the intra-cylinder pressure profile Pcyl. The method of calculating the indicated mean effective pressure from the intra-cylinder pressure profile is well-known, so it is not described here in detail. However, the indicated mean effective pressure should be obtained by performing rotation synchronous sampling at as high a speed as possible. The basic combustion air-fuel ratio value calculation means 245 calculates the basic combustion air-fuel ratio value C_abf0 from the indicated mean effective pressure Pi (details will be described below).

<Basic Combustion Air-Fuel Ratio Value Calculation Means 245 (FIG. 33)>

Figure 33:
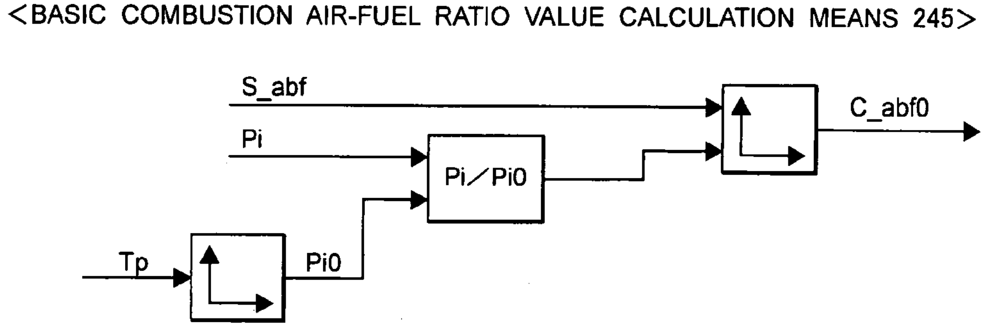
FIG. 33 is used to explain the basic combustion air-fuel ratio value calculation means shown in FIG. 32.

The basic combustion air-fuel ratio value calculation means 245 calculates the basic combustion air-fuel ratio value. Specifically, it obtains a reference indicated mean effective pressure Pi0 from the basic amount Tp of fuel to be injected, as shown in FIG. 33. Although the combustion air-fuel ratio C_abf0 is obtained from the ratio between the indicated mean effective pressure Pi and the reference indicated mean effective pressure Pi0, the supply air-fuel ratio S_abf is also referenced during the obtaining process. A general characteristic of the indicated mean effective pressure with respect to the combustion air-fuel ratio tends to show an upward convex with a pressure near the stoichiometry maximized if the ignition timing is constant. Accordingly, it is discriminated in advance whether the combustion air-fuel ratio is on the rich side or lean side with respect to the stoichiometry, according to the value of the supply air-fuel ratio.

Although the indicated mean effective pressure is used to obtain the basic combustion air-fuel ratio value in this example, the maximum intra-cylinder pressure within one cycle may be used.

Third Example (1C)

FIG. 34

Although a variation in rotation is detected to handle it as the combustion state having a correlation to the combustion air-fuel ratio in the first example and an intra-cylinder pressure is detected to handle it as the combustion state having a correlation to the combustion air-fuel ratio in the second example, an intra-cylinder temperature is detected to handle it as the combustion state having a correlation to the combustion air-fuel ratio in a third example.

Figure 34:
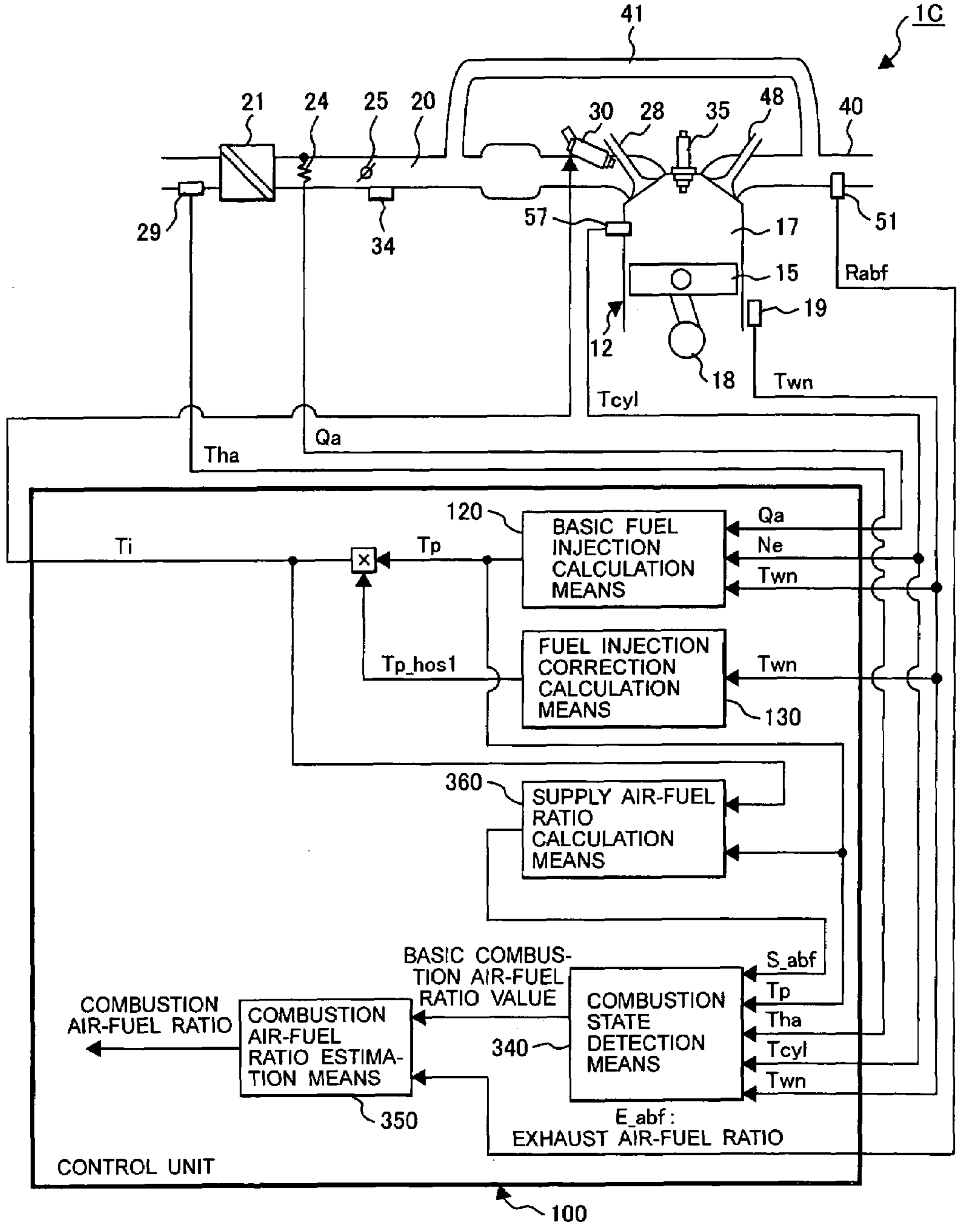
FIG. 34 shows a control system in a third example.

FIG. 34 shows a system indicating a controller 1C in the third example. Basically, the controller 1C shown in the drawing is the same as in the second example, but the intra-cylinder temperature sensor 57 rather than the intra-cylinder pressure sensor 56 is used to detect the combustion state. That is, the value Tcyl detected by the intra-cylinder temperature sensor 57 instead of the intra-cylinder pressure sensor 56 is used to detect the combustion state (the basic combustion air-fuel ratio value is calculated). Although being assigned a different reference numeral, each means having the same name as in the previous examples has almost the same structural function, so its explanation is simplified or omitted. The means having structural functions different from the previous examples will be mainly described below.

<Combustion State Detection Means 340 (FIG. 35)>

Figure 35:
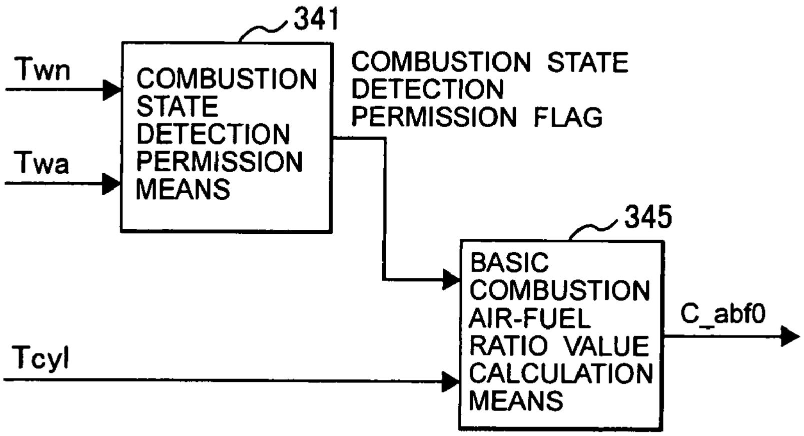
FIG. 35 is used to explain the combustion state detection means shown in FIG. 34.

FIG. 35 shows the combustion state detection means 340. The combustion state detection means 340 comprises a combustion state detection permission means 341 and a basic combustion air-fuel ratio value calculation means 345.

The combustion state detection permission means 341 determines whether to calculate the basic combustion air-fuel ratio value from the intra-cylinder temperature profile Tcyl. When detection is permitted, the combustion state detection permission flag is set to 1. The basic combustion air-fuel ratio value calculation means 345 calculates the basic combustion air-fuel ratio value C_abf0 from the intra-cylinder temperature profile Tcyl (details will be described below).

<Basic Combustion Air-Fuel Ratio Value Calculation Means 345 (FIG. 36)>

Figure 36:
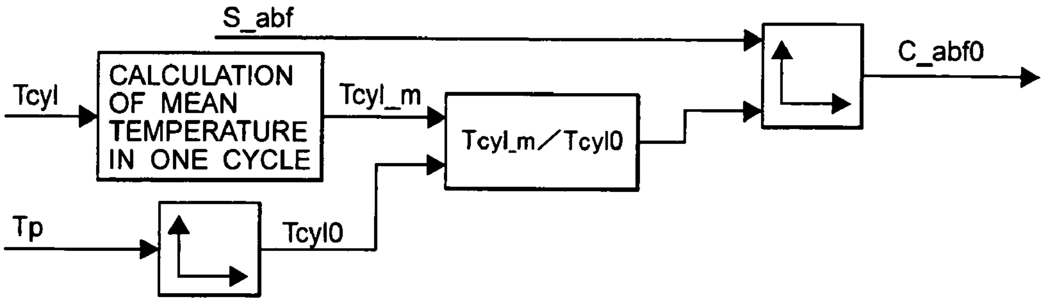
FIG. 36 is used to explain the basic combustion air-fuel ratio value calculation means shown in FIG. 35.

The basic combustion air-fuel ratio value calculation means 345 calculates the basic combustion air-fuel ratio value. Specifically, as shown in FIG. 36, it obtains a reference intra-cylinder temperature Tcyl0 from the basic amount Tp of fuel to be injected. Although the combustion air-fuel ratio C_abf0 is obtained from the ratio between a mean intra-cylinder temperature Tcyl_m in one cycle and the reference intra-cylinder temperature Tcyl0, the supply air-fuel ratio S_abf is also referenced during the obtaining process. A general characteristic of the intra-cylinder temperature with respect to the combustion air-fuel ratio tends to show an upward convex with a temperature near the stoichiometry maximized if the ignition timing is constant. Accordingly, it can be discriminated in advance whether the combustion air-fuel ratio is on the rich side or lean side with respect to the stoichiometry, according to the value of the supply air-fuel ratio.

Although the mean intra-cylinder temperature within one cycle is used to obtain the basic combustion air-fuel ratio value in this example, the maximum intra-cylinder temperature within one cycle may be used.

Fourth Example (1D)

FIG. 37

In the first, second, and third examples, a variation in rotation, an intra-cylinder pressure, and an intra-cylinder temperature are respectively detected to handle them as the combustion state having a correlation to the combustion air-fuel ratio, and the exhaust air-fuel ratio is also used to estimate or calculate the combustion air-fuel ratio. In a fourth example, the estimated combustion air-fuel ratio is used to calculate an engine control parameter (the amount of fuel to be injected in this example).

Figure 37:
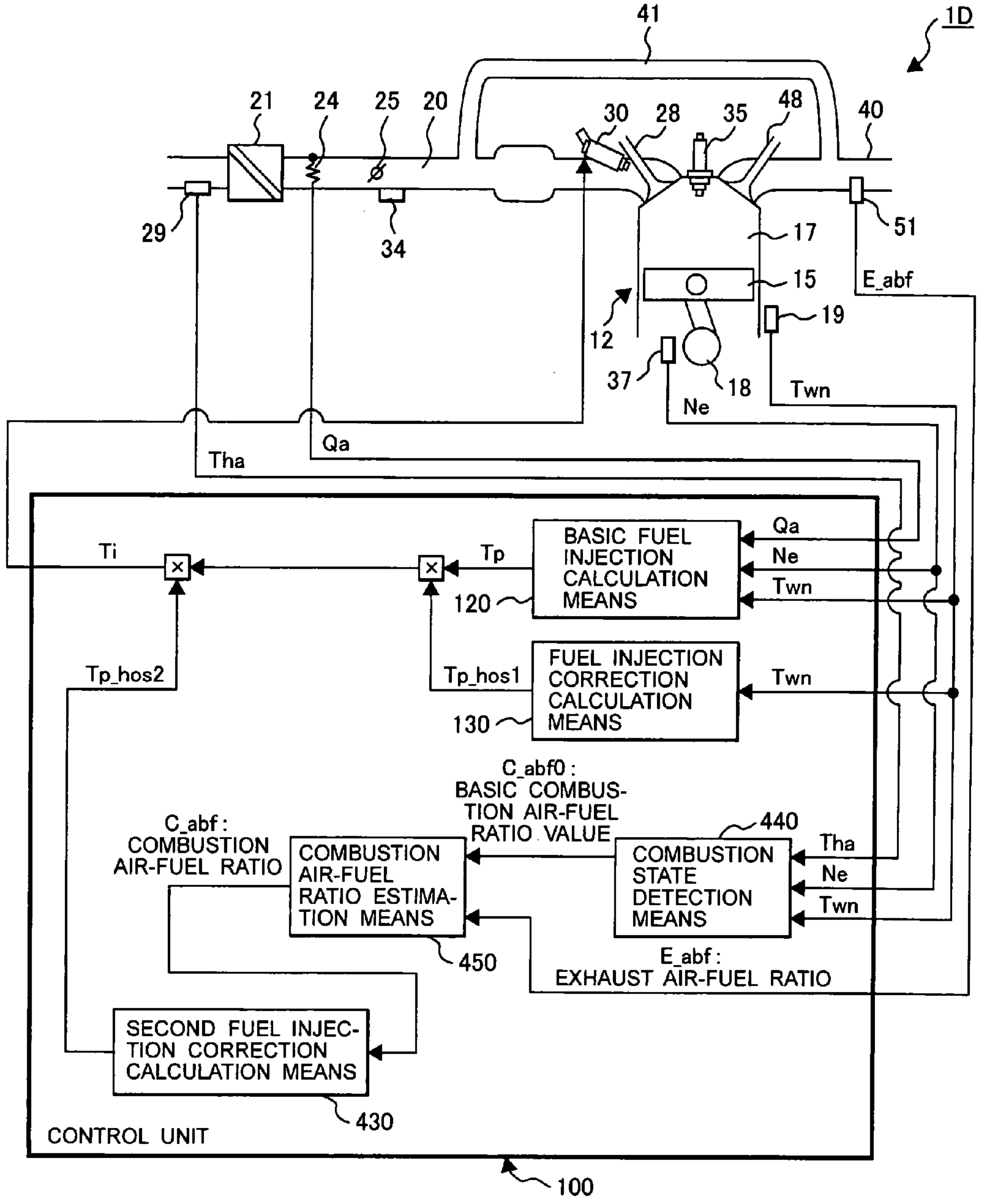
FIG. 37 shows a control system in a fourth example.

FIG. 37 shows a system indicating a controller 1D in the fourth example. Basically, the controller 1D shown in the drawing is the same as in the first example, but a second fuel injection correction calculation means for calculating the amount Tp_hos2 of fuel injection correction by use of the combustion air-fuel ratio C_abf is added. Although being assigned a different reference numeral, each means having the same name as in the previous examples has almost the same structural function, so its explanation is simplified or omitted. The means having structural functions different from the previous examples will be mainly described below.

<Second Fuel Injection Correction Calculation Means 430 and 430' (FIGS. 38 and 39)>

Figure 38:
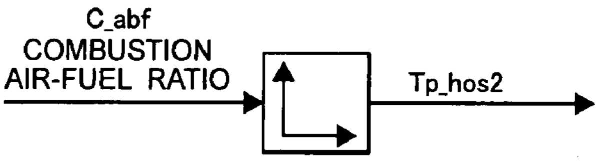
FIG. 38 shows an example of the second fuel injection correction calculation means shown in FIG. 37.
Figure 39:
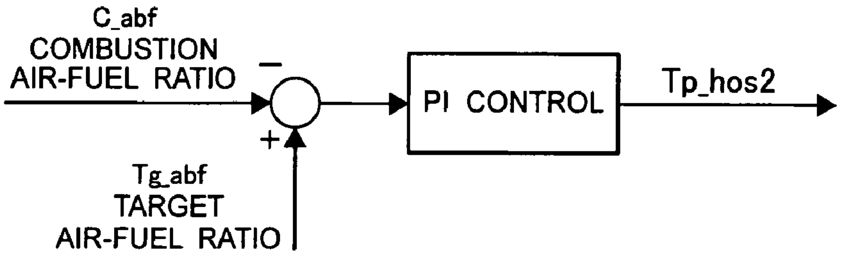
FIG. 39 shows another example of the second fuel injection correction calculation means shown in FIG. 37.

The second fuel injection correction calculation means 430 calculates the amount Tp_hos2 of fuel injection correction by use of the combustion air-fuel ratio C_abf. Specifically, as shown in FIG. 38, the second fuel injection correction calculation means 430 obtains Tp_hos2 from the combustion air-fuel ratio C_abf with reference to a map or the like. As with the second fuel injection correction calculation means 430' shown in FIG. 39, a PI control unit may be used to calculate the amount Tp_hos2 of fuel injection correction from a difference between a target air-fuel ratio Tg_abf and the combustion air-fuel ratio C_abf. A map setting and a setting in the PI control unit may be obtained on the basis of experience in test using actual vehicles.

Although, in this example, the combustion air-fuel ratio is obtained from a value detected by the revolutions sensor 37, the combustion air-fuel ratio may be estimated from the intra-cylinder pressure or intra-cylinder temperature described in the second and third examples.

Fifth Example (1E)

FIG. 40

In the method in the fourth example, the estimated combustion air-fuel ratio is used to calculate an engine control parameter (the amount of fuel to be injected). In a fifth example, the estimated combustion air-fuel ratio is used to operate a parameter for exhaust air-fuel ratio feedback control.

Figure 40:
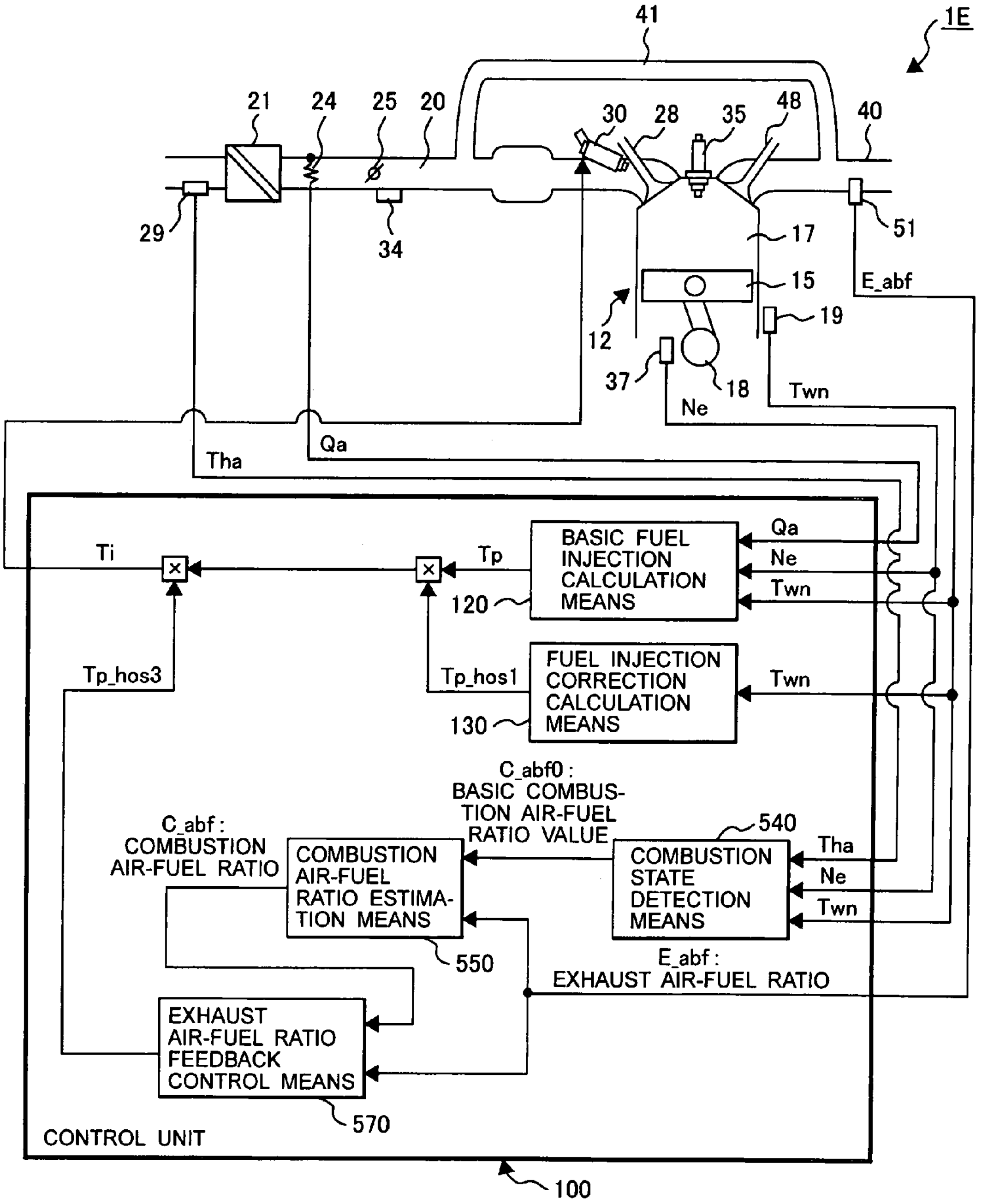
FIG. 40 shows a control system in a fifth example.

FIG. 40 shows a system indicating a controller 1E in the fifth example. The controller 1E shown in the drawing has a structure similar to the structure in the fourth example, but an exhaust air-fuel ratio feedback control means 570 is added instead of the second fuel injection correction calculation means 430. To operate the parameter for exhaust air-fuel ratio feedback control by use of the combustion air-fuel ratio C_abf, the combustion air-fuel ratio C_abf is input to the exhaust air-fuel ratio feedback control means 570. Although being assigned a different reference numeral, each means having the same name as in the previous examples has almost the same structural function, so its explanation is simplified or omitted. The means having structural functions different from the previous examples will be mainly described below.

<Exhaust Air-Fuel Ratio Feedback Control Means 570 (FIG. 41)>

Figure 41:
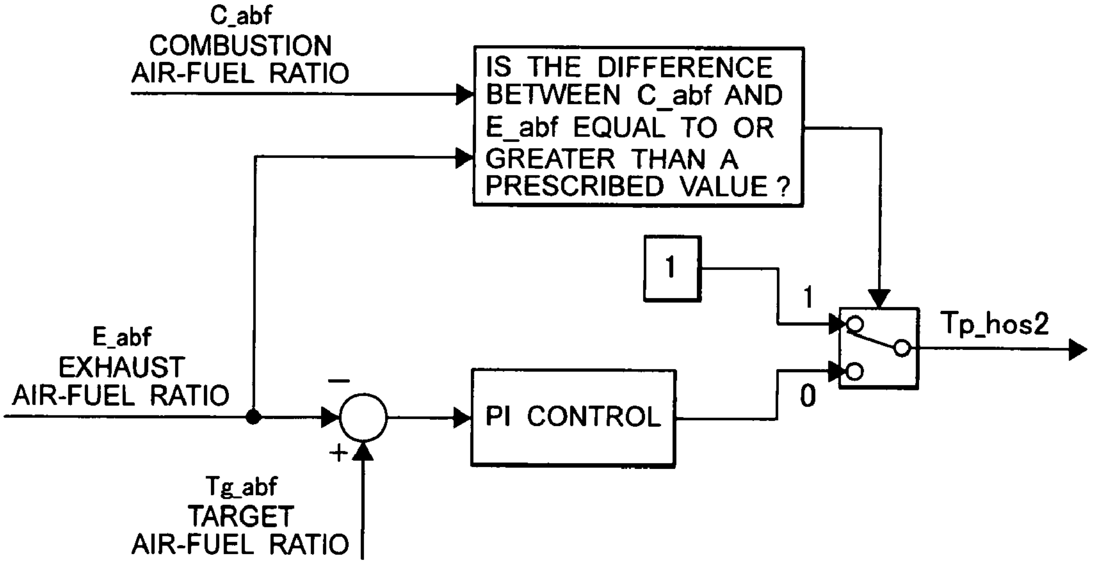
FIG. 41 is used to explain the exhaust air-fuel ratio feedback control means shown in FIG. 40.

The exhaust air-fuel ratio feedback control means 570 obtains the amount Tp_hos2 of fuel correction based on the exhaust air-fuel ratio E_abf. Specifically, as shown in FIG. 41, a PI control unit is used to obtain the amount Tp_hos2 of fuel injection correction from a difference between the exhaust air-fuel ratio E_abf and a target air-fuel ratio Tg_abf. However, when the difference between the combustion air-fuel ratio C_abf and the exhaust air-fuel ratio E_abf is equal to or greater than a prescribed value, the value of the exhaust air-fuel ratio E_abf is determined to have no validity and Tp_host2 is set to 1, stopping the feedback control based on the exhaust air-fuel ratio E_abf.

Although, in this example, the combustion air-fuel ratio is obtained on the basis of the detection by the revolutions sensor 37, it may be estimated from the intra-cylinder pressure or intra-cylinder temperature described in the second and third examples.

Sixth Example (1F)

FIG. 42

This example discloses a method of learning the relation between the combustion state and the combustion air-fuel ratio in an online manner.

Figure 42:
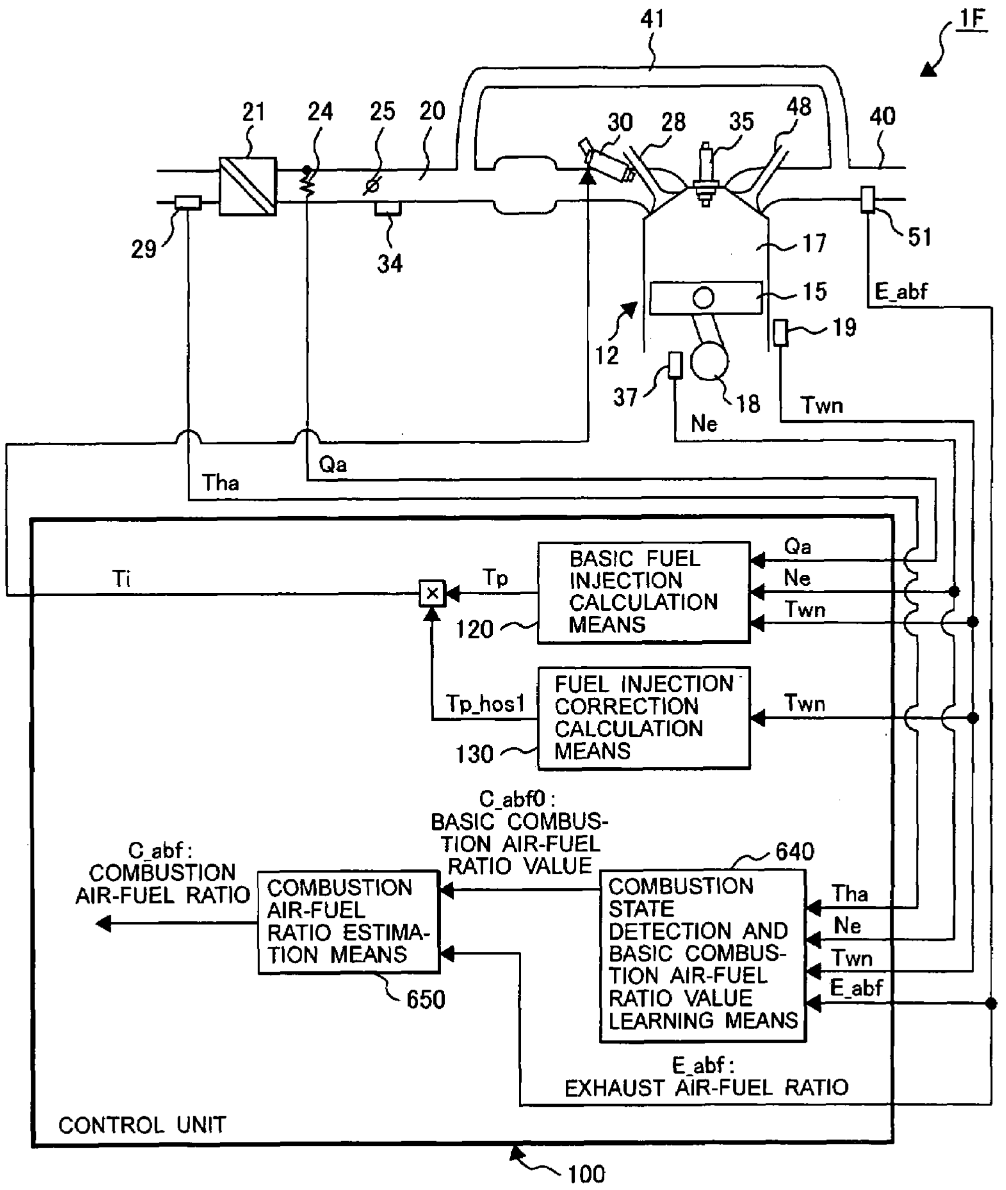
FIG. 42 shows a control system in a sixth example.

FIG. 42 shows a system indicating a controller 1F in a sixth example. In the controller 1F shown in the drawing, the combustion state detection means 140 in the first example in FIG. 18 is replaced with a combustion state detection and basic combustion air-fuel ratio value learning means 640. Although being assigned a different reference numeral, each means having the same name as in the previous examples has almost the same structural function, so its explanation is simplified or omitted. The means having structural functions different from the previous examples will be mainly described below.

<Combustion State Detection and Basic Combustion Air-Fuel Ratio Value Learning Means 640 (FIG. 43)>

Figure 43:
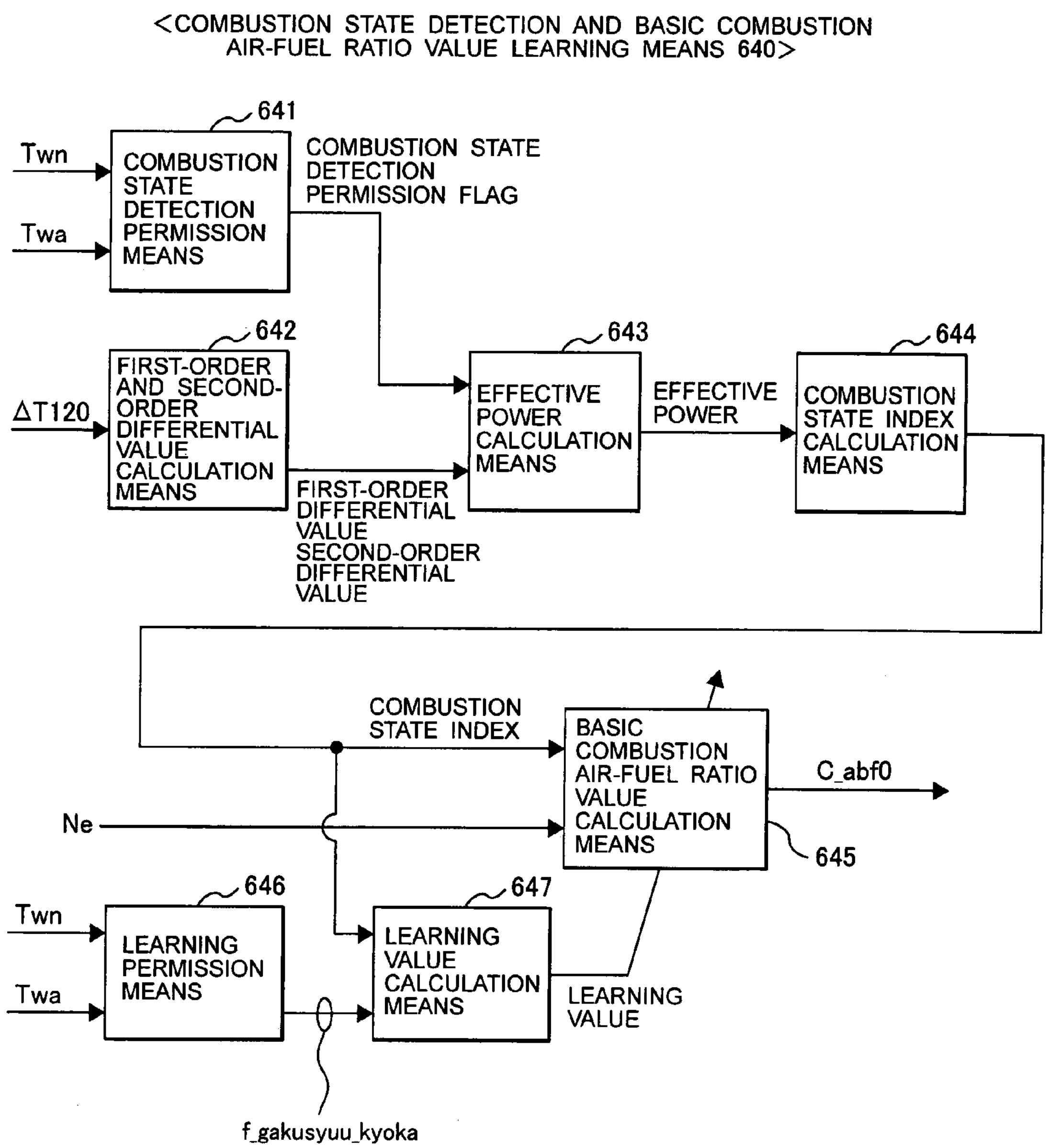
FIG. 43 is used to explain the combustion state detection and basic combustion air-fuel ratio value learning means shown in FIG. 42.

In the combustion state detection and basic combustion air-fuel ratio value learning means 640, as shown in FIG. 43, a learning permission means 646 and a learning value calculation means 647 are added to the combustion state detection means 140 (FIG. 21) in the first example; the calculation result given by the learning value calculation means 647 is entered into a basic combustion air-fuel ratio value calculation means 645. More specifically, when the learning permission flag f_gakusyuu_kyoka is 1, online learning of the relation between the combustion state and the combustion air-fuel ratio is permitted. The learning value calculation means

647 learns the relation between the exhaust air-fuel ratio E_abf and the combustion state index, which typifies the combustion state.

<Learning Permission Means 646 (FIG. 44)>

Figure 44:
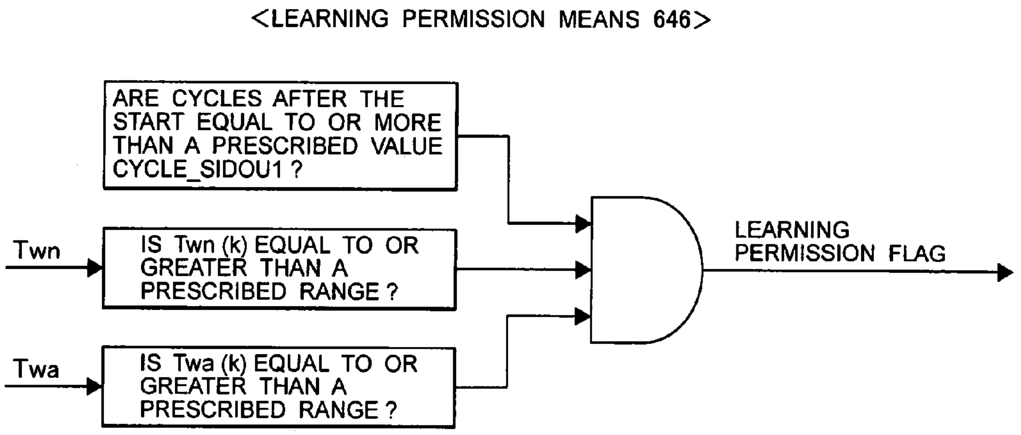
FIG. 44 is used to explain the learning permission means shown in FIG. 43.

The learning permission means 646 determines whether to permit online learning of the relation between the combustion state and the combustion air-fuel ratio. Specifically, as shown in FIG. 44, when cycles after the start are equal to or more than a prescribed value Cycle_sidou1, a cooling water temperature Twn is within a prescribed range, and an intake temperature Twa is within a prescribed range, the learning permission flag f_gakusuu_kyoka is set to 1, permitting the learning. In other cases, the learning permission flag f_gakusuu_kyoka is set to 0, inhibiting the learning. The above conditions are valid when there is no error between the combustion air-fuel ratio and the exhaust air-fuel ratio or such error, if any, is sufficiently small. The exhaust air-fuel ratio E_abf is then regarded as the combustion air-fuel ratio, and the relation between the combustion state (such as the strength of the variation), and the exhaust air-fuel ratio E_abf at that time is learned as the relation between the combustion state and the basic combustion air-fuel ratio value.

Figure 45:
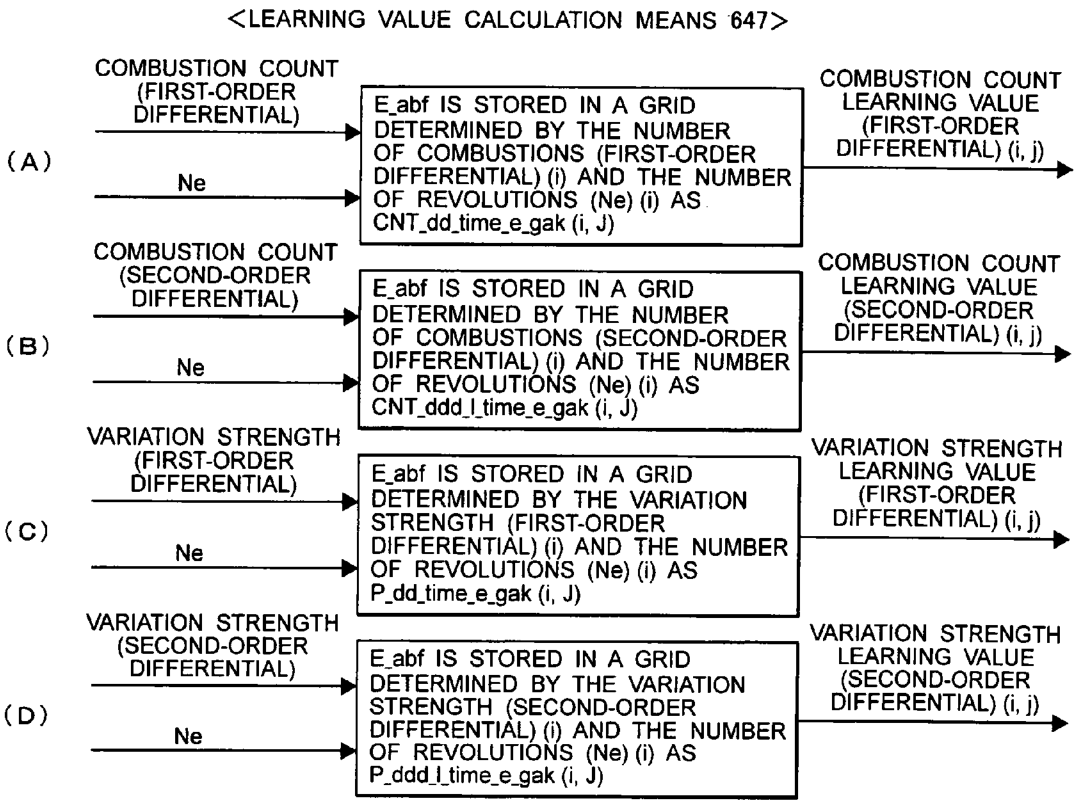
FIG. 45 is used to explain the learning value calculation means shown in FIG. 43.

<Learning Value Calculation Means 647 (FIG. 45)>

The learning value calculation means 647 calculates a learning value. Specifically, as shown by (A) to (D) in FIG. 45, for example, E_abf is stored in a learning map grid that is determined by the number of combustions (first-order differential) (i) and the number of revolutions (Ne) (j) as a learning value CNT_dd_time_e_gak (i, j); the learning value learns the relation between the number of combustions (first differential), which is an combustion state index, and the basic combustion air-fuel ratio value C_abf0.

A combustion count learning value (second-order differential), variation strength learning value (first-order differential), and variation strength learning value (second-order differential) are also calculated in a similar way, as illustrated in the drawing.

<Basic Combustion Air-Fuel Ratio Value Calculation Means 645 (FIG. 46)>

Figure 46:
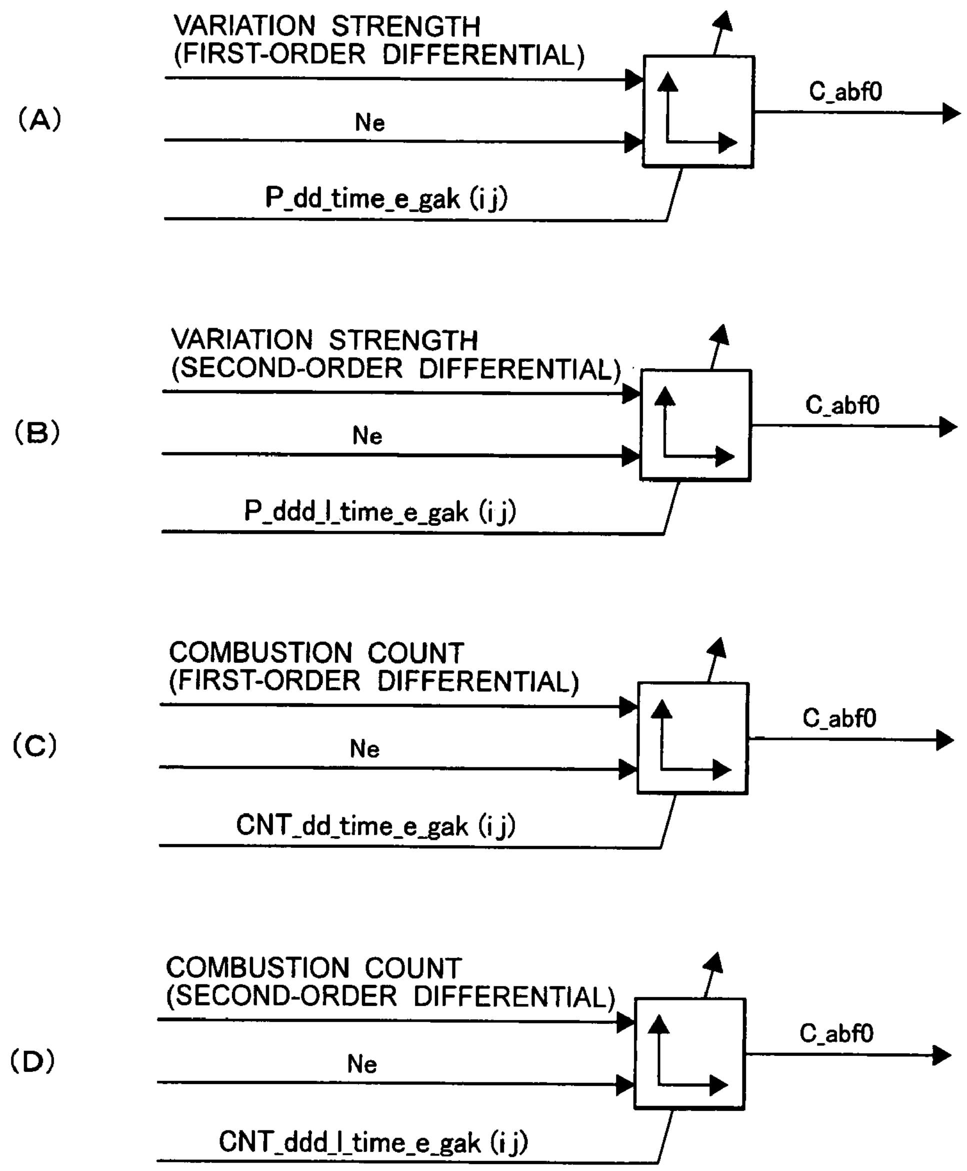
FIG. 46 is used to explain the basic combustion air-fuel ratio value calculation means shown in FIG. 43.

The basic combustion air-fuel ratio value calculation means 645 calculates the basic combustion air-fuel ratio value C_abf0 according to combustion state indexes. Specifically, as shown in FIG. 46, functions for reflecting the above learning values are added to the basic combustion air-fuel ratio value calculation means 145 (shown in FIG. 27) in the first example. The learning value CNT_dd_time_e_gak (i, j) for the number of combustions (first-order differential) is a value within the reference map area (i, j) in FIG. 46. Learning values CNT_ddd_1_time_e_gak (i, j), P_dd_time_e_gak (i, j), and P_ddd_1_time_e_gak (i, j) of other combustion state indexes, that is, the number of combustions (second-order differential), variation strength (first-order differential), and variation strength (second-order differential) are also reflected in a similar way, as shown in the drawing.

Although, in this example, the combustion air-fuel ratio is based on the detection by the revolutions sensor 37, combustion state indexes may be calculated from the intra-cylinder pressure or intra-cylinder temperature described in the second and third examples for the learning.

Seventh Example (1G)

FIG. 47

This example discloses a method of estimating a state (vaporization rate) of the fuel to be used from the supply air-fuel ratio, combustion air-fuel ratio, and exhaust air-fuel ratio. The example is based on the method in the second example.

Figure 47:
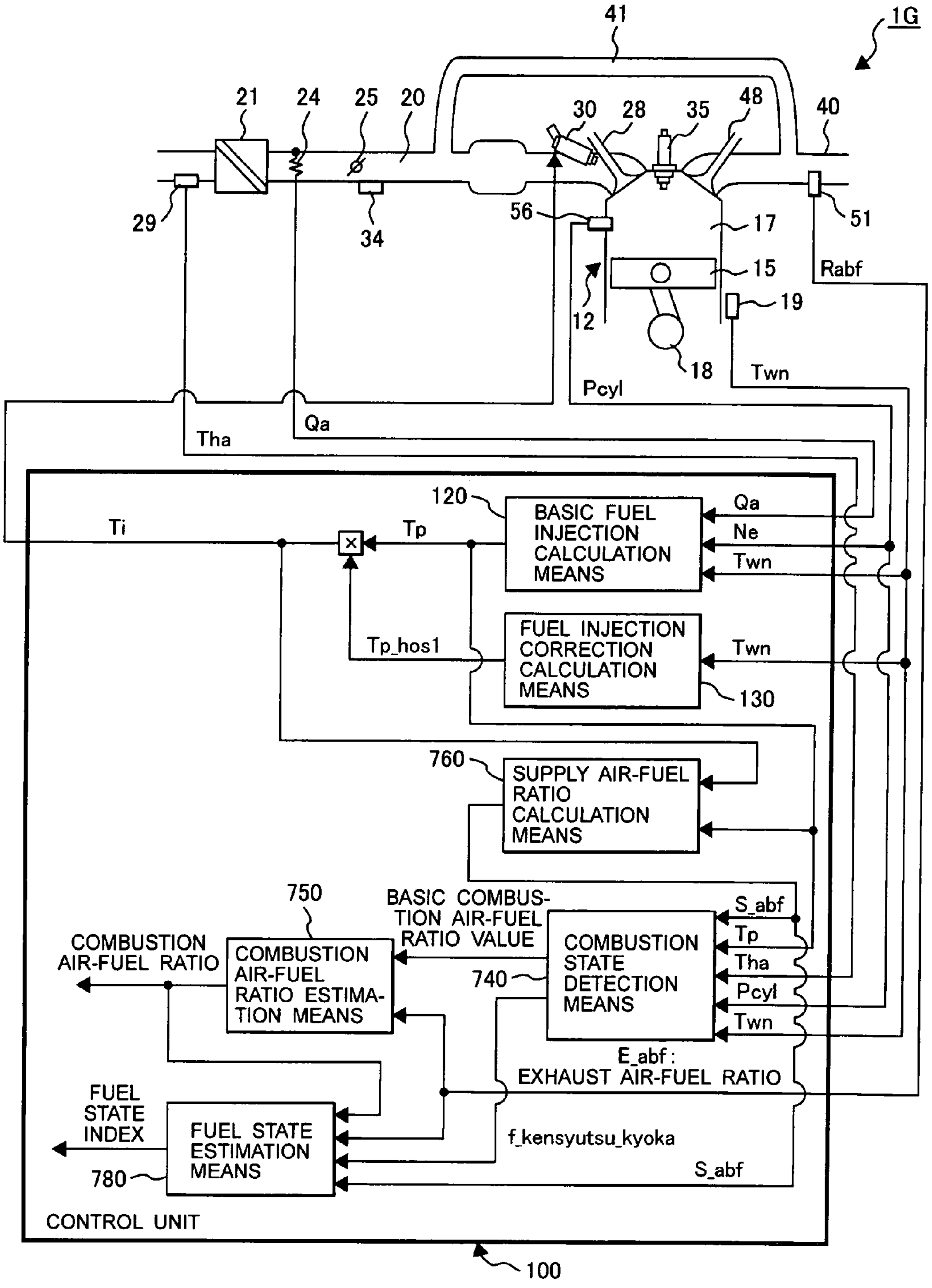
FIG. 47 shows a control system in a seventh example.

FIG. 47 shows a system indicating a controller 1G in the seventh example. In the controller 1G in the drawing, a fuel state estimation means 780 is added to the second example in FIG. 30. The fuel state estimation means 780 detects a fuel state by comparing the supply air-fuel ratio, combustion air-fuel ratio, and exhaust air-fuel ratio in an area in which the fuel vaporization rate is relatively low due to, for example, a low engine temperature and an effect by a difference in fuel state is thereby produced with ease. Although being assigned a different reference numeral, each means having the same name as in the previous examples has almost the same structural function, so its explanation is simplified or omitted. The means having structural functions different from the previous examples will be mainly described below.

<Fuel State Estimation Means 780 (FIG. 48)>

Figure 48:
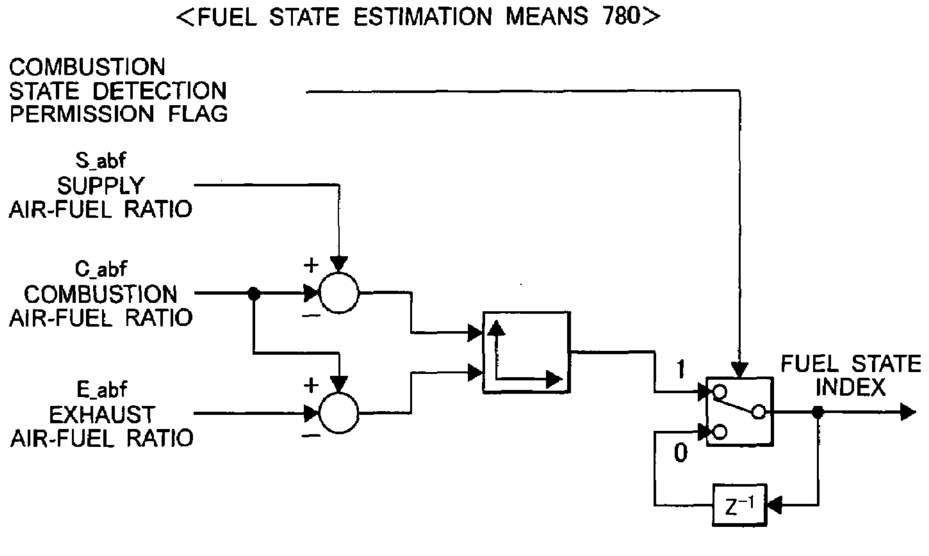
FIG. 48 shows the fuel state estimation means shown in FIG. 47.

The fuel state estimation means 780 estimates the state of the fuel to be used. Specifically, as shown in FIG. 48, when the combustion state detection permission flag is 1, the fuel state estimation means 780 calculates the fuel state index from a difference between the supply air-fuel ratio S_abf and the combustion air-fuel ratio C_abf and a difference between the combustion air-fuel ratio C_abf and the exhaust air-fuel ratio E_abf, with reference to a map. That is, the characteristics of the air-fuel ratio transmission system are largely affected by the fuel state (fuel vaporization rate). Accordingly, the fuel state estimation means 780 detects a fuel state by comparing the supply air-fuel ratio, combustion air-fuel ratio, and exhaust air-fuel ratio in an area in which the fuel vaporization rate is relatively low due to, for example, a low engine temperature and an effect by a difference in fuel state is thereby produced with ease. When the combustion state detection permission flag is 0, the previous fuel state index value is maintained.

Although, in this example, the basic combustion air-fuel ratio value is obtained from the indicated mean effective pressure, the maximum intra-cylinder pressure in one cycle may be used. Alternatively, the basic combustion air-fuel ratio value may be obtained from the variation in rotation or the intra-cylinder temperature described in the first and third examples may be used.

What is claimed is:

1. An engine controller, comprising means for determining an actual combustion state upon combustion of air-fuel mixture in a combustion chamber, and a combustion air-fuel ratio estimation means for estimating a combustion air-fuel ratio of the mixture in the combustion chamber according to an exhaust air-fuel ratio and the determined actual combustion state in the combustion chamber for executing an air-fuel ratio feedback control based thereupon during engine operation to adjust the amount of fuel in the mixture to control the air-fuel ratio in the combustion chamber including during periods of engine operation having a low vaporization rate.

2. The engine controller according to claim 1, further comprising a means for calculating an engine control parameter according to the estimated combustion exhaust air-fuel ratio.

3. The engine controller according to claim 1, wherein the combustion state detection or estimation means estimates the combustion state according to engine revolutions or an nth-order differential value (n: integer) of the engine revolutions.

4. The engine controller according to claim 1, wherein the combustion state detection or estimation means estimates the combustion state according to at least one of an intra-cylinder pressure, an intra-cylinder temperature, and a generated torque in the engine.

5. The engine controller according to claim 1, wherein an exhaust sensor for sensing the exhaust air-fuel ratio is provided in an exhaust path.

6. The engine controller according to claim 5, wherein the combustion state detection or estimation means calculates a basic combustion air-fuel ratio value from the combustion state and the combustion air-fuel ratio estimation means estimates the combustion air-fuel ratio according to the basic combustion air-fuel ratio value and the exhaust air-fuel ratio.

7. The engine controller according to claim 6, wherein the combustion air-fuel ratio estimation means compares the basic combustion air-fuel ratio value with the exhaust air-fuel ratio and estimates either the basic combustion air-fuel ratio value or the exhaust air-fuel ratio as the combustion air-fuel ratio according to a comparison result.

8. The engine controller according to claim 6, wherein the combustion air-fuel ratio estimation means estimates the larger of the basic combustion air-fuel ratio value and the exhaust air-fuel ratio as the combustion air-fuel ratio.

9. The engine controller according to claim 5, wherein the combustion air-fuel ratio estimation means calculates the amount of exhaust air-fuel ratio correction according to the combustion state and estimates a value obtained by correcting the exhaust air-fuel ratio with the calculated amount of exhaust air-fuel ratio correction as a combustion air-fuel ratio.

10. The engine controller according to claim 2, wherein the control parameter calculation means calculates at least one of the amount of fuel to be injected, an ignition timing, and the amount of air to be inhaled as the control parameter.

11. The engine controller according to claim 2, further comprising a control parameter calculation permission means that permits or denies control parameter calculation, which is performed by the control parameter calculation means on the basis of the combustion air-fuel ratio, according to the running state of the engine.

12. The engine controller according to claim 11, wherein the control parameter calculation permission means permits or denies the control parameter calculation according to an engine cooling water temperature, an inhaled air temperature, a time elapsed from the time of start, the total number of cycles after the start, the total amount of air inhaled after the start, and other parameters that typify an engine temperature.

13. The engine controller according to claim 12, wherein the control parameter calculation permission means permits the engine control parameter calculation on the basis of the combustion air-fuel ratio when at least one of the following conditions is met: the engine cooling water temperature is equal to or lower than a prescribed value, the temperature of air to be inhaled into the engine is equal to or lower than a prescribed value, the time elapsed after the start of the engine is equal to or less than a prescribed value, the total number of cycles after the start of the engine is equal to or smaller than a prescribed value, and the total amount of air inhaled after the start of the engine is equal to or smaller than a prescribed value.

14. The engine controller according to claim 11, wherein the control parameter calculation permission means has the control parameter calculation means correct engine control parameters on the basis of the exhaust air-fuel ratio or deny the engine control parameter calculation, when a difference or a ratio between the combustion air-fuel ratio and the exhaust air-fuel ratio is equal to or greater than a prescribed value.

15. The engine controller according to claim 2, wherein the control parameter calculation means corrects a control parameter for controlling the amount of fuel according to a fed-back exhaust air-fuel ratio, or stops feedback control.

16. The engine controller according to claim 6, further comprising a means for learning the relation between the combustion state and the basic combustion air-fuel ratio value according to the exhaust air-fuel ratio.

17. The engine controller according to claim 16, wherein the learning means performs the learning according to the running state of the engine.

18. The engine controller according to claim 17, wherein the learning means performs the learning when at least one of the following conditions is met: an engine cooling water temperature is equal to or higher than a prescribed value, the temperature of air to be inhaled into the engine is equal to or higher than a prescribed value, a time elapsed after the start of the engine is equal to or more than a prescribed value, the total number of cycles after the start of the engine is equal to or more than a prescribed value, and the total amount of air inhaled after the start of the engine is equal to or more than a prescribed value.

19. The engine controller according to claim 1, further comprising a means for calculating a supply air-fuel ratio according to the amount of air to be inhaled into the engine and the amount of fuel to be injected.

20. The engine controller according to claim 19, wherein the supply air-fuel ratio, the combustion air-fuel ratio, and the exhaust air-fuel ratio are estimated or detected independently.

21. The engine controller according to claim 20, further comprising the control parameter calculation means for performing engine control parameter calculation according to the supply air-fuel ratio, the combustion air-fuel ratio, and the exhaust air-fuel ratio.

22. The engine controller according to claim 19, further comprising a means for estimating a fuel state according to at least one of the supply air-fuel ratio, the combustion air-fuel ratio, and the exhaust air-fuel ratio.

23. The engine controller according to claim 22, wherein the combustion air-fuel ratio estimation means, the control parameter calculation means, and the fuel state estimation means handle the air-fuel ratio in a dimension of an equivalence ratio.

24. The engine controller according to claim 1, wherein even when a detected value of the exhaust air-fuel ratio differs from the combustion exhaust air-fuel ratio during the execution of feedback control according to the exhaust air-fuel ratio, the combustion air-fuel ratio is controlled to a desired air-fuel ratio.

* * * * *